(12) United States Patent
Miyasaka et al.

(10) Patent No.: US 11,694,492 B2
(45) Date of Patent: Jul. 4, 2023

(54) VEHICLE MALFUNCTION CAUSE IDENTIFYING DEVICE

(71) Applicant: TOYOTA JIDOSHA KABUSHIKI KAISHA, Toyota (JP)

(72) Inventors: Kenji Miyasaka, Toyota (JP); Atsushi Tabata, Okazaki (JP); Takeshi Kitahata, Toyota (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 336 days.

(21) Appl. No.: 17/066,575

(22) Filed: Oct. 9, 2020

(65) Prior Publication Data

US 2021/0118250 A1 Apr. 22, 2021

(30) Foreign Application Priority Data

Oct. 17, 2019 (JP) .................................. 2019-190598

(51) Int. Cl.
*G07C 5/08* (2006.01)
*G06N 20/00* (2019.01)

(52) U.S. Cl.
CPC .......... *G07C 5/0816* (2013.01); *G06N 20/00* (2019.01); *G07C 5/0808* (2013.01)

(58) Field of Classification Search
CPC .... G07C 5/0816; G07C 5/0808; G06N 20/00; G06N 3/08
See application file for complete search history.

(56) References Cited

U.S. PATENT DOCUMENTS

| 9,702,315 | B1* | 7/2017 | Palmer | G07C 5/008 |
| 11,184,749 | B2* | 11/2021 | Na | H04L 67/12 |
| 2005/0192727 | A1* | 9/2005 | Shostak | G07C 5/0808 |
| | | | | 701/1 |
| 2005/0273218 | A1* | 12/2005 | Breed | G07C 5/085 |
| | | | | 701/2 |
| 2006/0123692 | A1* | 6/2006 | Beronja | G07C 5/0808 |
| | | | | 43/61 |
| 2013/0338855 | A1* | 12/2013 | Mason | G07C 5/008 |
| | | | | 701/2 |
| 2017/0103101 | A1* | 4/2017 | Mason | G06F 16/2365 |

(Continued)

FOREIGN PATENT DOCUMENTS

| DE | 102015216494 A1 * | 3/2017 | ............. B60R 16/02 |
| JP | 2006-027391 A | 2/2006 | |

*Primary Examiner* — Joseph J Dallo
(74) *Attorney, Agent, or Firm* — Oblon, McClelland, Maier & Neustadt, L.L.P.

(57) ABSTRACT

A cause for a malfunction in a vehicle is identified using a preset malfunction cause identifying model indicating a relation between the cause for the malfunction identified based on a detection value of an experimental vehicle sensor such as an oil pressure sensor, which is a detection value allowing the cause for the malfunction to be identified more easily than a detection value of an in-vehicle sensor group that is the same as an in-vehicle sensor group equipped in the vehicle, and the detection value of the in-vehicle sensor group, and the detection value of the in-vehicle sensor group when the malfunction has occurred in the vehicle. Therefore, in the case where the vehicle is not equipped with the experimental vehicle sensor, it is possible to improve the accuracy of the identification of the cause for the malfunction in the vehicle.

6 Claims, 12 Drawing Sheets

(56) References Cited

U.S. PATENT DOCUMENTS

2018/0144388 A1* 5/2018 Mattern ............. G06Q 30/0631
2019/0197797 A1* 6/2019 Na ......................... H04W 4/44
2022/0060869 A1* 2/2022 Na ......................... H04W 4/44

* cited by examiner

| AT GEAR STAGE | C1 | C2 | B1 | B2 | F1 |
|---|---|---|---|---|---|
| 1st | ◯ | | | △ | ◯ |
| 2nd | ◯ | | ◯ | | |
| 3rd | ◯ | ◯ | | | |
| 4th | | ◯ | ◯ | | |
| Rev | ◯ | | | ◯ | |

VEHICLE MALFUNCTION CAUSE IDENTIFYING DEVICE

CROSS-REFERENCE TO RELATED APPLICATION

This application claims priority to Japanese Patent Application No. 2019-190598 filed on Oct. 17, 2019, incorporated herein by reference in its entirety.

BACKGROUND

1. Technical Field

The disclosure relates to a vehicle malfunction cause identifying device that identifies a cause for a malfunction in a vehicle.

2. Description of Related Art

There is well known a vehicle malfunction cause identifying device that identifies a cause for a malfunction in a vehicle, when the malfunction has occurred in the vehicle. The vehicle malfunction cause identifying device identifies the cause for the malfunction, using the detection value of an in-vehicle sensor that is equipped in the vehicle and that detects a behavior state of the vehicle. As an example, a malfunction analysis system is described in Japanese Patent Application Publication No. 2006-27391 (JP 2006-27391 A). As disclosed in JP 2006-27391 A, the malfunction analysis system makes a database of a correlation between vehicle state information that can be acquired by a sensor or the like equipped in the vehicle and surrounding environment information about the vehicle that can be acquired from an external institution in the exterior of the vehicle, and uses the database for the analysis of the malfunction in the vehicle.

SUMMARY

In some kinds of malfunctions, it is difficult to identify the cause for the malfunction from the detection value of the in-vehicle sensor equipped in the vehicle. That is, in the case where the vehicle is not equipped with a sensor that detects, for example, a behavior state during the malfunction that allows the cause for the malfunction to be easily identified, there is fear of decrease in the accuracy of the identification of the cause for the malfunction, because the cause for the malfunction is identified based on the detection value of the in-vehicle sensor that detects, for example, a behavior state during the malfunction that does not allows the cause for the malfunction to be easily identified.

The disclosure has been made in the context of the above circumstance, and an object of the disclosure is to provide a vehicle malfunction cause identifying device that makes it possible to improve the accuracy of the identification of the cause for the malfunction in the vehicle.

A first aspect of the disclosure is (a) a vehicle malfunction cause identifying device that identifies a cause for a malfunction in a vehicle using a detection value of an in-vehicle sensor when the malfunction has occurred in the vehicle, the in-vehicle sensor being equipped in the vehicle and detecting a behavior state of the vehicle, (b) in which the vehicle malfunction cause identifying device identifies the cause for the malfunction in the vehicle, by applying the detection value of the in-vehicle sensor when the malfunction has occurred in the vehicle, to a malfunction cause identifying model that is preset using a second vehicle equipped with a first sensor and a second sensor, the first sensor being the same as the in-vehicle sensor, the second sensor being not equipped in the vehicle, a detection value of the second sensor allowing a cause for a malfunction in the second vehicle to be identified more easily than a detection value of the first sensor, the malfunction cause identifying model indicating a relation between the cause for the malfunction in the second vehicle identified based on the detection value of the second sensor and the detection value of the first sensor when the malfunction has occurred in the second vehicle.

A second aspect of the disclosure may be the vehicle malfunction cause identifying device according to the first aspect, in which the vehicle malfunction cause identifying device determines whether the malfunction has occurred in the vehicle, based on the detection value of the in-vehicle sensor.

A third aspect of the disclosure may be the vehicle malfunction cause identifying device according to the first or second aspect, in which: the malfunction cause identifying model further indicates a relation between the cause for the malfunction in the second vehicle identified based on the detection value of the second sensor and information about a production lot of the vehicle; and the vehicle malfunction cause identifying device identifies the cause for the malfunction in the vehicle, also in consideration of the information about the production lot of the vehicle.

A fourth aspect of the disclosure may be the vehicle malfunction cause identifying device according to any one of the first to third aspects, in which: the malfunction is a faulty gear shift of a vehicle transmission including a hydraulic frictional engagement device; and the detection value of the second sensor is a value of an oil pressure of an operating oil by which an operating state of the frictional engagement device is switched.

A fifth aspect of the disclosure may be the vehicle malfunction cause identifying device according to any one of the first to fourth aspects, in which a temporal change in the detection value of the in-vehicle sensor is used for the identification of the cause for the malfunction in the vehicle.

A sixth aspect of the disclosure may be the vehicle malfunction cause identifying device according to any one of the first to fifth aspects, in which the malfunction cause identifying model is realized as a result of a supervised learning by an artificial intelligence including a database unit that accumulates data and an inference unit that estimates a conclusion from the data.

A seventh aspect of the disclosure may be the vehicle malfunction cause identifying device according to the sixth aspect, in which training data to be used for the supervised learning by the artificial intelligence is altered based on a statistical difference in the detection value of the in-vehicle sensor, the detection value of the in-vehicle sensor differing depending on a production lot of the vehicle.

With the first aspect, the cause for the malfunction in the vehicle is identified using the preset malfunction cause identifying model indicating the relation between the cause for the malfunction identified based on the detection value of the second sensor equipped in the second vehicle, which is a detection value allowing the cause for the malfunction to be identified more easily than the detection value of the first sensor equipped in the second vehicle, and the detection value of the first sensor, and the detection value of the in-vehicle sensor when the malfunction has occurred in the vehicle. Therefore, in the case where the vehicle is not equipped with the second sensor, it is possible to improve the accuracy of the identification of the cause for the malfunction in the vehicle.

With the second aspect, it is determined whether the malfunction has occurred in the vehicle, based on the detection value of the in-vehicle sensor. Therefore, it is possible to accurately identify the cause for the vehicle malfunction determined based on the detection value of the in-vehicle sensor, using the malfunction cause identifying model preset based on the detection value of the second sensor that is not equipped in the vehicle.

With the third aspect, the cause for the malfunction is identified also in consideration of the information about the production lot of the vehicle. Therefore, even when the detection value of the in-vehicle sensor varies depending on the difference in the production lot, it is possible to accurately identify the cause for the malfunction in the vehicle.

With the fourth aspect, the detection value of the second sensor is the value of the oil pressure of the operating oil by which the operating state of the frictional engagement device of the vehicle transmission is switched. Therefore, it is possible to accurately identify the cause for the faulty gear shift of the vehicle transmission.

With the fifth aspect, the temporal change in the detection value of the in-vehicle sensor is used for the identification of the cause for the malfunction. Therefore, it is possible to accurately identify the cause for the malfunction using the malfunction cause identifying model.

With the sixth aspect, the malfunction cause identifying model is realized as a result of the supervised learning by the artificial intelligence. Therefore, it is possible to construct the malfunction cause identifying model that allows the cause for the malfunction to be accurately identified.

With the seventh aspect, the training data to be used for the supervised learning by the artificial intelligence is altered based on the statistical difference in the detection value of the in-vehicle sensor, which differs depending on the production lot of the vehicle. Therefore, even when the detection value of the in-vehicle sensor varies depending on the difference in the production lot, it is possible to construct the malfunction cause identifying model that allows the cause for the malfunction to be accurately identified.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an embodiment of the disclosure, a vehicle includes a dynamic power source and a dynamic power transmitting device. The dynamic power transmitting device includes a vehicle transmission. The gear ratio of the vehicle transmission is "the rotating speed of a rotating member on the input side/the rotating speed of a rotating member on the output side". A high-side of the gear ratio is a high-vehicle-speed side that is aside on which the gear ratio is low. A low-side of the gear ratio is a low-vehicle-speed side that is a side on which the gear ratio is high. For example, a lowest-side gear ratio is a gear ratio on a lowest-vehicle-speed side on which the vehicle speed is lowest, and is a highest gear ratio at which the gear ratio is a highest value.

The dynamic power source is an engine such as a gasoline engine or diesel engine that generates dynamic power by combustion of fuel, for example. The vehicle may include an electric motor or the like as the dynamic power source, in addition to the engine or instead of the engine. In a broad sense, the electric motor is an engine.

The embodiment of the disclosure will be described below in detail with reference to the drawings.

Figure 1:
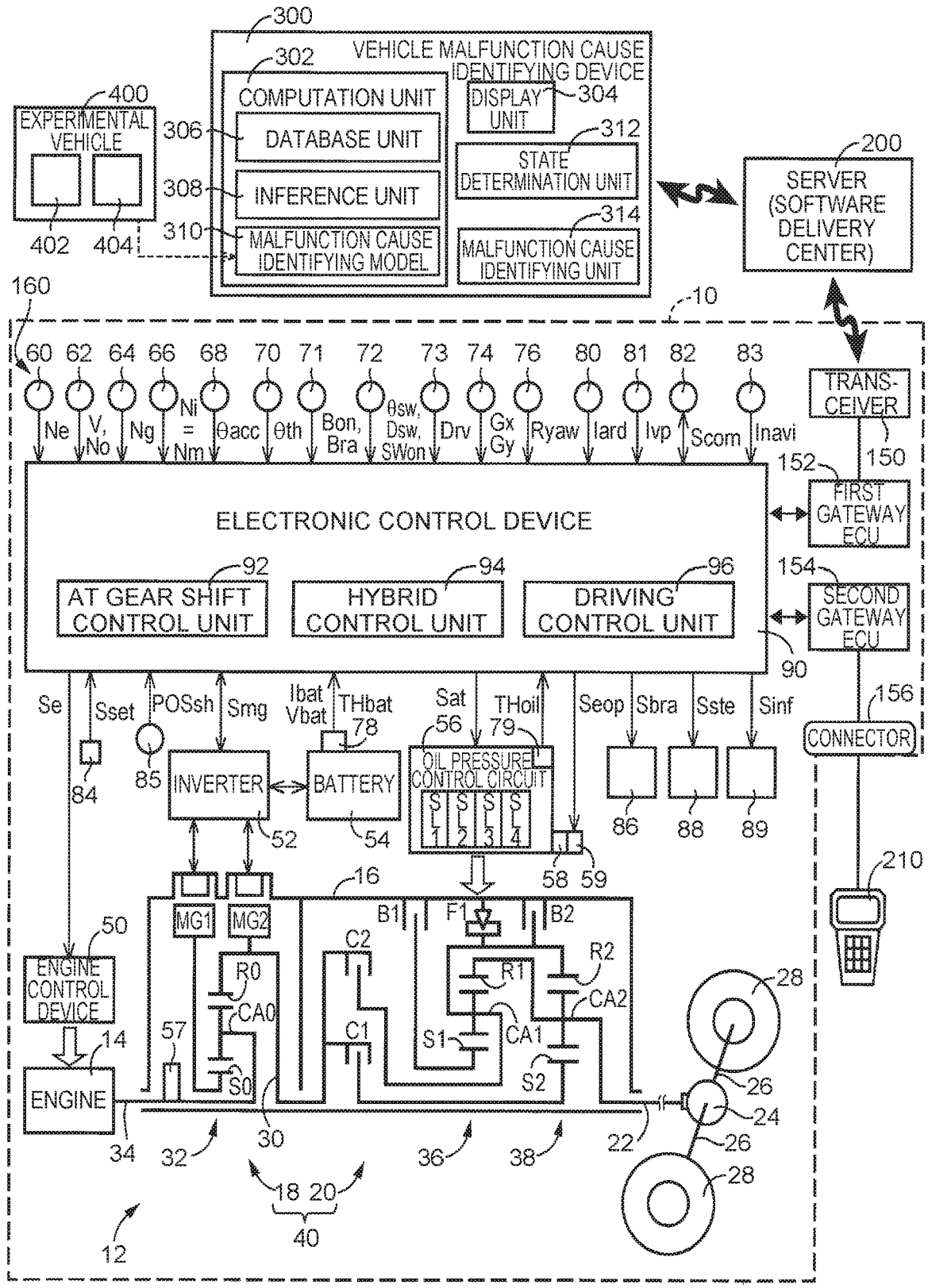
FIG. 1 is a diagram for describing a schematic configuration of a vehicle to which the disclosure is applied, and is a diagram for describing major control functions and control systems for various controls in the vehicle.

FIG. 1 is a diagram for describing a schematic configuration of a dynamic power transmitting device 12 of a vehicle 10 to which the disclosure is applied, and is a diagram for describing major control systems for various controls in the vehicle 10. In FIG. 1, the vehicle 10 includes an engine 14, a first rotating machine MG1 and a second rotating machine MG2. The dynamic power transmitting device 12 includes an electric continuously variable transmission unit 18, a mechanical stepped transmission unit 20 and the like that are disposed in series on a common shaft center in a transmission case 16 attached to a vehicle body as a non-rotating member. The electric continuously variable transmission unit 18 is coupled to the engine 14 directly or indirectly through an unillustrated damper and the like. The mechanical stepped transmission unit 20 is coupled to the output side of the electric continuously variable transmission unit 18. The dynamic power transmitting device 12 includes a differential gear mechanism 24 coupled to an output shaft 22 that is an output rotating member of the mechanical stepped transmission unit 20, a pair of axles 26 coupled to the differential gear mechanism 24, and the like. In the dynamic power transmitting device 12, dynamic power output from the engine 14 or the second rotating machine MG2 is transmitted to the mechanical stepped transmission unit 20, and is transmitted from the mechanical stepped transmission unit 20 to drive wheels 28 of the vehicle 10 through the differential gear mechanism 24 and the like. Hereinafter, the transmission case 16 is referred to as the case 16, the electric continuously variable transmission unit 18 is referred to as the continuously variable transmission unit 18, and the mechanical stepped transmission unit 20 is referred to as the stepped transmission unit 20. Unless otherwise noted, the dynamic power has the same meaning as torque or force. The continuously variable transmission unit 18, the stepped transmission unit 20 and the like are configured nearly symmetrically with respect to the common shaft center, and in FIG. 1, the lower half under the shaft center is omitted. The common shaft center is the shaft center of a crankshaft of the engine 14, a connecting shaft 34 described later, and the like.

The engine 14 is an engine that functions as a dynamic power source that can generate drive torque, and is a known internal combustion engine such as a gasoline engine or a diesel engine, for example. For the engine 14, an electronic control device 90 described later controls an engine control device 50 included in the vehicle 10 and having a throttle actuator, a fuel injection device and an ignition device, and thereby an engine torque Te that is the output torque of the engine 14 is controlled. In the embodiment, the engine 14 is coupled to the continuously variable transmission unit 18, without a hydraulic power transmission such as a torque converter and a fluid coupling.

Each of the first rotating machine MG1 and the second rotating machine MG2 is a rotating electric machine that has a function as an electric motor (motor) and a function as an electric generator (generator), and is a so-called motor generator. Each of the first rotating machine MG1 and the second rotating machine MG2 is connected to a battery 54 as an electric storage device of the vehicle 10, through an inverter 52 of the vehicle 10. For each of the first rotating machine MG1 and the second rotating machine MG2, the electronic control device 90 described later controls the inverter 52, and thereby a MG1 torque Tg that is the output torque of the first rotating machine MG1 and a MG2 torque Tm that is the output torque of the second rotating machine MG2 are controlled. For example, in the case of positive rotation, in the output torque of the rotating machine, a positive torque on the acceleration side is a powering torque, and a negative torque on the deceleration side is a regenerative torque. The battery 54 is an electric storage device that exchanges electric power with each of the first rotating machine MG1 and the second rotating machine MG2.

The continuously variable transmission unit 18 includes the first rotating machine MG1 and a differential mechanism 32 as a dynamic split device that mechanically splits the dynamic power of the engine 14 into the first rotating machine MG1 and an intermediate transmitting member 30 that is an output rotating member of the continuously variable transmission unit 18. The intermediate transmitting member 30 is coupled to the second rotating machine MG2, so as to be capable of transmitting the dynamic power. The continuously variable transmission unit 18 is an electric continuously variable transmission in which a working state of the first rotating machine MG1 is controlled and thereby a differential state of the differential mechanism 32 is controlled. The first rotating machine MG1 is a rotating machine that can control an engine rotating speed Ne that is the rotating speed of the engine 14, and corresponds to a rotating machine for differential. The second rotating machine MG2 is a rotating machine that functions as a dynamic power source that can generate drive torque, and corresponds to a rotating machine for traveling drive. The vehicle 10 is a hybrid vehicle that includes the engine 14 and the second rotating machine MG2 as dynamic power sources for traveling. The dynamic power transmitting device 12 transmits the dynamic power of the dynamic power source to the drive wheels 28. Controlling the working state of the first rotating machine MG1 is performing a working control of the first rotating machine MG1.

The differential mechanism 32 is constituted by a single pinion planetary gear device, and includes a sun gear S0, a carrier CA0 and a ring gear R0. The engine 14 is coupled to the carrier CA0 through the connecting shaft 34, so as to be capable of transmitting the dynamic power. The first rotating machine MG1 is coupled to the sun gear S0, so as to be capable of transmitting the dynamic power. The second rotating machine MG2 is coupled to the ring gear R0, so as to be capable of transmitting the dynamic power. In the differential mechanism 32, the carrier CA0 functions as an input element, the sun gear S0 functions as a reaction element, and the ring gear R0 functions as an output element.

The stepped transmission unit 20 is a mechanical transmission mechanism as a stepped transmission that constitutes a part of a dynamic transmission path between the intermediate transmitting member 30 and the drive wheels 28. That is, the stepped transmission unit 20 is a mechanical transmission mechanism that constitutes a part of a dynamic transmission path between the continuously variable transmission unit 18 and the drive wheels 28. The intermediate transmitting member 30 functions also as an input rotating member of the stepped transmission unit 20. Since the second rotating machine MG2 is coupled to the intermediate transmitting member 30 so as to integrally rotate, or since the engine 14 is coupled to the input side of the continuously variable transmission unit 18, the stepped transmission unit 20 is a transmission that constitutes a part of a dynamic power transmission path between the dynamic power source (the second rotating machine MG2 or the engine 14) and the drive wheels 28. The intermediate transmitting member 30 is a transmitting member for transmitting the dynamic power of the dynamic power source to the drive wheels 28. For example, the stepped transmission unit 20 is a known planetary gear type automatic transmission that has a plurality of sets of planetary gear devices including a first planetary gear device 36 and a second planetary gear device 38 and a plurality of engagement devices including a one-way clutch F1, a clutch C1, a clutch C2, a brake B1 and a brake B2. Hereinafter, the clutch C1, the clutch C2, the brake B1 and the brake B2 are referred to as merely an engagement device CB when the clutch C1, the clutch C2, the brake B1 and the brake B2 are not discriminated.

The engagement device CB is a hydraulic frictional engagement device constituted by a clutch or brake that has multiple discs or a single disc and that is pressed by a hydraulic actuator, a band brake that is tightened by the hydraulic actuator, and the like. In the engagement device CB, respective torque capacities are changed by respective oil pressures Pc1, Pc2, Pb1, Pb2 (see FIG. 4 described later) as respective adjusted engagement pressures of the engagement device CB that are output from the oil pressure control circuit 56 of the vehicle 10, and thereby an operating state such as an engagement state and a disengagement state is switched.

In the stepped transmission unit 20, each rotating element of the first planetary gear device 36 and the second planetary gear device 38 is coupled to another rotating element, the intermediate transmitting member 30, the case 16 or the output shaft 22, directly or indirectly through the engagement device CB or the one-way clutch F1. The rotating elements of the first planetary gear device 36 are a sun gear S1, a carrier CA1 and a ring gear R1, and the rotating elements of the second planetary gear device 38 are a sun gear S2, a carrier CA2 and a ring gear R2.

The stepped transmission unit 20 is a stepped transmission in which one gear stage of a plurality of gear stages having different gear ratios γat (=AT input rotating speed Ni/output rotating speed No) is formed, for example, by the engagement of a predetermined engagement device of a plurality of engagement devices. In other words, in the stepped transmission unit 20, by the engagement of one of the plurality of engagement devices, the gear stage is switched, that is, the gear shift is executed. The stepped transmission unit 20 is a stepped automatic transmission in which each of the plurality of gear stages is formed. In the embodiment, a gear stage that is formed in the stepped transmission unit 20 is referred to as an AT gear stage. The AT input rotating speed Ni is the input rotating speed of the stepped transmission unit 20 that is the rotating speed of the input rotating member of the stepped transmission unit 20. The AT input rotating speed Ni is the same value as the rotating speed of the intermediate transmitting member 30, and is the same value as the MG2 rotating speed Nm that is the rotating speed of the second rotating machine MG2. The AT input rotating speed Ni can be expressed as the MG2 rotating speed Nm. The output rotating speed No is the rotating speed of the output shaft 22 that is the output rotating speed of the stepped transmission unit 20, and is also the output rotating speed of a composite transmission 40 that is the whole transmission in which the continuously variable transmission unit 18 and the stepped transmission unit 20 are combined. The composite transmission 40 is a transmission that constitutes a part of the dynamic power transmission path between the engine 14 and the drive wheels 28.

Figures 2, 3:
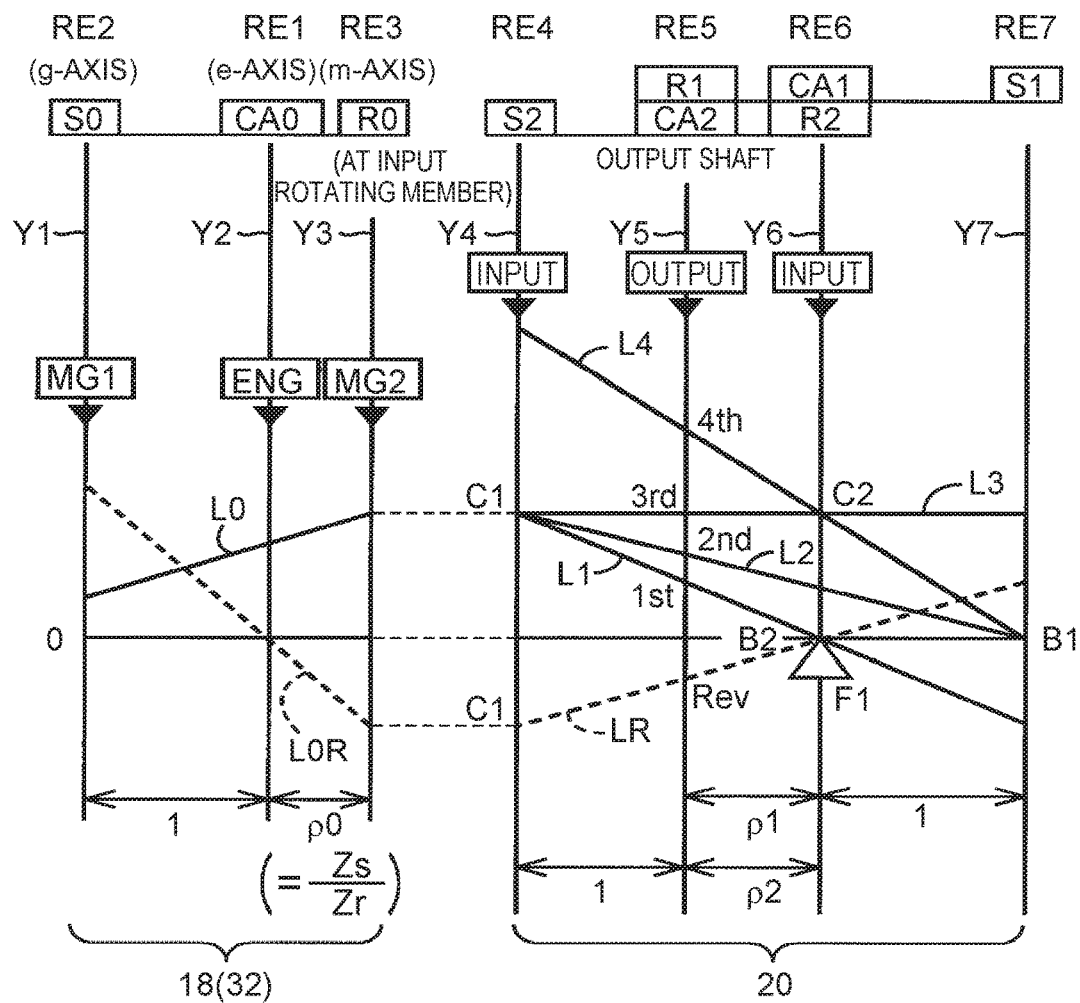
FIG. 2 is an operation chart for describing a relation between a gear shift operation of a mechanical stepped transmission unit illustrated in FIG. 1 and a combination of operations of engagement devices that are used for the gear shift operation.
FIG. 3 is an alignment chart showing a relative relation of rotating speeds of rotating elements between an electric continuously variable transmission unit and the mechanical stepped transmission unit.

In the stepped transmission unit 20, for example, as shown in an engagement operation table in FIG. 2, four AT gear stages for advance that are AT first gear stage ("1st" in FIG. 2) to AT fourth gear stage ("4th" in FIG. 2) are formed as a plurality of AT gear stages. The AT first gear stage has the highest gear ratio γat, and a higher AT gear stage has a lower gear ratio γat. An AT gear stage for reverse ("Rev" in FIG. 2) is formed by the engagement of the clutch C1 and the engagement of the brake B2, for example. That is, as described later, for example, the AT first gear stage is formed at the time of reverse traveling. The engagement operation table in FIG. 2 shows a relation between each AT gear stage and the operating states of the engagement devices. That is, the engagement operation table in FIG. 2 shows a relation between each AT gear stage and predetermined engagement devices that are engaged in the AT gear stage. In FIG. 2, "◯" shows the engagement, "Δ" shows the engagement at the time of engine brake or at the time of coast down shift of the stepped transmission unit 20, and the blank shows the disengagement.

For the stepped transmission unit 20, the electronic control device 90 described later switches the AT gear stage that is formed depending on an accelerator operation by a driver, a vehicle speed V and the like, that is, selectively forms one of the plurality of AT gear stages. For example, in the gear shift control of the stepped transmission unit 20, the gear shift is executed by switching to another elements of the engagement device CB, that is, a so-called clutch-to-clutch gear shift is executed. In the clutch-to-clutch gear shift, the gear shift is executed by switching of the engagement device CB between the engagement and the disengagement. In the embodiment, for example, a downshift from the AT second gear stage to the AT first gear stage is referred to as a 2→1 downshift. The same goes for other upshifts and downshifts.

The vehicle 10 further includes an MOP 57 that is a mechanical oil pump, an EOP 58 that is an electric oil pump, and the like. The MOP 57, which is coupled to the connecting shaft 34, is rotated with the rotation of the engine 14, so that the MOP 57 discharges an operating oil (oil) to be used in the dynamic power transmitting device 12. For example, the MOP 57 discharges the operating oil (oil) by being rotated by the engine 14. The EOP 58 discharges the operating oil (oil) by being rotated by a motor 59 dedicated for the oil pump of the vehicle 10. The operating oil (oil) discharged by the MOP 57 or the EOP 58 is the operating oil of the stepped transmission unit 20 that is used for the switching of the operating state of the engagement device CB.

FIG. 3 is an alignment chart showing a relative relation of the rotating speeds of the rotating elements between the continuously variable transmission unit 18 and the stepped transmission unit 20. In FIG. 3, three vertical lines Y1, Y2, Y3 corresponding to the three rotating elements of the differential mechanism 32 constituting the continuously variable transmission unit 18 are, in the order from the left, a g-axis indicating the rotating speed of the sun gear S0 corresponding to a second rotating element RE2, an e-axis indicating the rotating speed of the carrier CA0 corresponding to a first rotating element RE1, and an m-axis indicating the rotating speed of the ring gear R0 corresponding to a third rotating element RE3 (that is, the input rotating speed of the stepped transmission unit 20). Further, four vertical lines Y4, Y5, Y6, Y7 of the stepped transmission unit 20 are, in the order from the left, an axis indicating the rotating speed of the sun gear S2 corresponding to a fourth rotating element RE4, an axis indicating the rotating speed of the mutually coupled ring gear R1 and carrier CA2 corresponding to a fifth rotating element RE5 (that is, the rotating speed of the output shaft 22), an axis indicating the rotating speed of the mutually coupled carrier CA1 and ring gear R2 corresponding to the sixth rotating element RE6, and an axis indicating the rotating speed of the sun gear S corresponding to the seventh rotating element RE7. Intervals among the vertical lines Y, Y2, Y3 are set depending on a gear ratio $\rho 0$ of the differential mechanism 32. Intervals among the vertical lines Y4, Y5, Y6, Y7 are set depending on gear ratios $\rho 1$, $\rho 2$ of the first and second planetary gear devices 36, 38. When an interval corresponding to "1" is set between the sun gear and the carrier in the relation among the vertical lines in the alignment chart, an interval corresponding to a gear ratio $\rho$ (=the number Zs of the tooth of the sun gear/the number Zr of the tooth of the ring gear) of the planetary gear device is set between the carrier and the ring gear.

As illustrated in the alignment chart of FIG. 3, in the differential mechanism 32 of the continuously variable transmission unit 18, the engine 14 (see "ENG" in FIG. 3) is coupled to the first rotating element RE1, the first rotating machine MG1 (see "MG1" in FIG. 3) is coupled to the second rotating element RE2, the second rotating machine MG2 (see "MG2" in FIG. 3) is coupled to the third rotating element RE3 that rotates integrally with the intermediate transmitting member 30, and the rotation of the engine 14 is transmitted to the stepped transmission unit 20 through the intermediate transmitting member 30. For the continuously variable transmission unit 18, the relation between the rotating speed of the sun gear S0 and the rotating speed of the ring gear R0 is shown by straight lines L0, L0R that cross the vertical line Y2.

In the stepped transmission unit 20, the fourth rotating element RE4 is selectively coupled to the intermediate transmitting member 30 through the clutch C1, the fifth rotating element RE5 is coupled to the output shaft 22, the sixth rotating element RE6 is selectively coupled to the intermediate transmitting member 30 through the clutch C2 and is selectively coupled to the case 16 through the brake B2, and the seventh rotating element RE7 is selectively coupled to the case 16 through the brake B. For the stepped transmission unit 20, the rotating speeds of "1st", "2nd", "3rd", "4th" and "Rev" of the output shaft 22 are shown by straight lines L1, L2, L3, L4, LR that cross the vertical line Y5 by the engagement-disengagement control of the engagement device CB.

The straight line L0 and straight lines L1, L2, L3, L4 shown as solid lines in FIG. 3 show the relative speeds of the rotating elements during advance traveling in a hybrid traveling mode in which the vehicle 10 can perform a hybrid traveling using at least the engine 14 as the dynamic power source. In the hybrid traveling mode, when a reaction torque that is a negative torque of the engine torque Te to be input to the carrier CA0 is input to the sun gear S0 with positive rotation by the first rotating machine MG1 in the differential mechanism 32, an engine direct-transmission torque Td (=Te/(1+$\rho 0$)=−(1/$\rho 0$)×Tg) that is a positive torque at the time of positive rotation appears in the ring gear R0. Then, depending on a required drive force, a total torque of the engine direct-transmission torque Td and the MG2 torque Tm, as a drive torque in the advance direction of the vehicle 10, is transmitted to the drive wheels 28 through the stepped transmission unit 20, in which one of the AT first gear stage to AT fourth gear stage is formed. On this occasion, the first rotating machine MG1 functions as an electric generator that generates a negative torque at the time of positive rotation. A generated electric power Wg of the first rotating machine MG1 is used for charge of the battery 54 or is consumed by the second rotating machine MG2. The second rotating machine MG2 outputs the MG2 torque Tm using all or some of the generated electric power Wg, or using the electric power from the battery 54 in addition to the generated electric power Wg.

Although not illustrated in FIG. 3, in an alignment chart for a motor traveling mode in which the vehicle 10 can perform a motor traveling using the second rotating machine MG2 as the dynamic power source while the engine 14 is stopped, the carrier CA0 is not rotated, and the MG2 torque Tm that is a positive torque at the time of positive rotation is input to the ring gear R0, in the differential mechanism 32. On this occasion, the first rotating machine MG1 coupled to the sun gear S0 is in a no-load state, and idles with negative rotation. That is, in the motor traveling mode, the engine 14 is not driven, the engine rotating speed Ne is zero, and the MG2 torque Tm, as a drive torque in the advance direction of the vehicle 10, is transmitted to the drive wheels 28 through the stepped transmission unit 20, in which one of the AT first gear stage to AT fourth gear stage is formed. The MG2 torque Tm at this time is a powering torque for positive rotation.

The straight line L0R and straight line LR shown as broken lines in FIG. 3 show the relative speeds of the rotating elements during the reverse traveling in the motor traveling mode. During the reverse traveling in the motor traveling mode, the MG2 torque Tm that is a negative torque at the time of negative rotation is input to the ring gear R0, and then the MG2 torque Tm, as a drive torque in the reverse direction of the vehicle 10, is transmitted to the drive wheels 28 through the stepped transmission unit 20, in which the AT first gear stage is formed. The electronic control device 90 described later forms, for example, the AT first gear stage that is of the plurality of AT gear stages and that is on the low-side for advance, and in this state, the MG2 torque Tm for reverse that has the opposite sign of the sign of the MG2 torque Tm for advance during the advance traveling is output from the second rotating machine MG2, so that the vehicle 10 can perform the reverse traveling. On this occasion, the MG2 torque Tm for advance is a positive powering torque for positive rotation, and the MG2 torque Tm for reverse is a negative powering torque for negative rotation. In this way, using the AT gear stage for advance, the vehicle 10 performs the reverse traveling by inverting the sign of the MG2 torque Tm. The use of the AT gear stage for advance is the use of the same AT gear stage as that at the time of the advance traveling. In the hybrid traveling mode, the second rotating machine MG2 can negatively rotate as shown by the straight line L0R, and therefore, the vehicle 10 can perform the reverse traveling similarly to the motor traveling mode.

In the dynamic power transmitting device 12, the continuously variable transmission unit 18 as an electric transmission mechanism is configured. The continuously variable transmission unit 18 includes the differential mechanism 32 having the three rotating elements: the carrier CA0 as the first rotating element RE1 to which the engine 14 is coupled so as to be capable of transmitting the dynamic power; the sun gear S0 as the second rotating element RE2 to which the first rotating machine MG1 is coupled so as to be capable of transmitting the dynamic power; and the ring gear R0 as the third rotating element RE3 to which the intermediate transmitting member 30 is coupled. The continuously variable transmission unit 18 is configured as an electric transmission mechanism in which the differential state of the differential mechanism 32 is controlled by the control of the working state of the first rotating machine MG1. The third rotating element RE3 to which the intermediate transmitting member 30 is coupled, in a different point of view, is the third rotating element RE3 to which the second rotating machine MG2 is coupled so as to be capable of transmitting the dynamic power. That is, in the dynamic power transmitting device 12, there is configured the continuously variable transmission unit 18 including the differential mechanism 32 to which the engine 14 is coupled so as to be capable of transmitting the dynamic power and the first rotating machine MG1 that is coupled to the differential mechanism 32 so as to be capable of transmitting the dynamic power, and allowing the differential state of the differential mechanism 32 to be controlled by the control of the working state of the first rotating machine MG1. The continuously variable transmission unit 18 operates as an electric continuously variable transmission that changes a gear ratio $\gamma 0$ (=Ne/Nm). The gear ratio $\gamma 0$ is the value of the ratio between the engine rotating speed Ne that is the same value of the rotating speed of the connecting shaft 34 as the input rotating member and the MG2 rotating speed Nm that is the rotating speed of the intermediate transmitting member 30 as the output rotating member.

For example, in the hybrid traveling mode, when the rotating speed of the sun gear S0 is increased or decreased by the control of the rotating speed of the first rotating machine MG1, relative to the rotating speed of the ring gear R0 that is restricted by the rotation of the drive wheels 28 due to the formation of the AT gear stage in the stepped transmission unit 20, the rotating speed of the carrier CA0, that is, the engine rotating speed Ne is increased or decreased. Accordingly, in the hybrid traveling, it is possible to operate the engine 14 at an efficient working point. That is, the stepped transmission unit 20 in which the AT gear stage is formed and the continuously variable transmission unit 18 that is operated as a continuously variable transmission can constitute a continuously variable transmission as the whole of the composite transmission 40 in which the continuously variable transmission unit 18 and the stepped transmission unit 20 are disposed in series.

Further, the continuously variable transmission unit 18 can perform the gear shift like a stepped transmission. Therefore, the stepped transmission unit 20 in which the AT gear stage is formed and the continuously variable transmission unit 18 that performs the gear shift like a stepped transmission can perform the gear shift like a stepped transmission as the whole of the composite transmission 40. That is, in the composite transmission 40, it is possible to control the stepped transmission unit 20 and the continuously variable transmission unit 18, so as to selectively establish one of a plurality of gear stages that are different in a gear ratio $\gamma t$ (=Ne/No) indicating the value of the ratio of the engine rotating speed Ne to the output rotating speed No. In the embodiment, the gear stage that is established in the composite transmission 40 is referred to as a simulated gear stage. The gear ratio $\gamma t$ is the total gear ratio that is formed by the continuously variable transmission unit 18 and stepped transmission unit 20 disposed in series, and is a value ($\gamma t = \gamma 0 \times \gamma at$) resulting from multiplying the gear ratio $\gamma 0$ of the continuously variable transmission unit 18 and the gear ratio $\gamma at$ of the stepped transmission unit 20.

The simulated gear stage is assigned, for example, such that a single or a plurality of kinds of simulated gear stages is established for each AT gear stage of the stepped transmission unit 20, depending on the combination of the AT gear stages of the stepped transmission unit 20 and a single or a plurality of kinds of gear ratios $\gamma 0$ of the continuously variable transmission unit 18. For example, the simulated gear stage is preset such that a simulated first gear stage to a simulated third gear stage are established for the AT first gear stage, a simulated fourth gear stage to a simulated sixth gear stage are established for the AT second gear stage, a simulated seventh gear stage to a simulated ninth gear stage are established for the AT third gear stage, and a simulated tenth gear stage is established for the AT fourth gear stage.

In the composite transmission 40, the continuously variable transmission unit 18 is controlled such that the engine rotating speed Ne realizes a predetermined gear ratio $\gamma t$ to the output rotating speed No, and thereby different simulated gear stages are established for a certain AT gear stage. Further, in the composite transmission 40, the continuously variable transmission unit 18 is controlled in response to the switching of the AT gear stage, and thereby the simulated gear stage is switched.

Back to FIG. 1, the vehicle 10 includes the electronic control device 90 as a controller including a control device of the vehicle 10 that is related to the control of the engine 14, the continuously variable transmission unit 18, the stepped transmission unit 20 and the like. Therefore, FIG. 1 is a diagram showing an input-output system of the electronic control device 90, and is a functional block diagram for describing major control functions of the electronic control device 90. The electronic control device 90 is configured to include a so-called microcomputer having a CPU, a RAM, a ROM and an input-output interface, for example. The CPU executes various controls of the vehicle 10 by performing signal processing in accordance with programs previously stored in the ROM while using a temporary storage function of the RAM. As necessary, the electronic control device 90 is configured to be divided into a device for engine control, a device for gear shift control, and the like.

The electronic control device 90 receives various signals and the like (for example, the engine rotating speed Ne, the output rotating speed No corresponding to the vehicle speed V, a MG1 rotating speed Ng that is the rotating speed of the first rotating machine MG1, a MG2 rotating speed Nm that is the AT input rotating speed Ni, an accelerator operation amount $\theta acc$ as an acceleration operation amount indicating the magnitude of an acceleration operation by the driver, a throttle valve opening degree $\theta th$ that is the opening degree of an electronic throttle valve, a brake-on signal Bon that is a signal indicating a state where a brake pedal for actuating a wheel brake is being operated by the driver, a brake operation amount Bra corresponding to a pedal force on the brake pedal and indicating the magnitude of a pedaling operation of the brake pedal by the driver, a steering angle $\theta sw$ and steering direction Dsw of a steering wheel of the vehicle 10, a steering-on signal SWon that is a signal indicating a state where the steering wheel is held by the driver, a driver state signal Drv that is a signal indicating the state of the driver, a front-rear acceleration Gx of the vehicle 10, a right-left acceleration Gy of the vehicle 10, a yaw rate Ryaw that is the turning angle velocity of the vehicle 10 around a vertical axis, a battery temperature THbat, battery charge-discharge current Ibat and battery voltage Vbat of the battery 54, an operating oil temperature THoil that is the temperature of the operating oil (oil), vehicle surrounding information Iard, position information Ivp, a communication signal Scom, navigation information Inavi, a driving assist setting signal Sset that is a signal indicating a setting by the driver in a driving assist control such as an automatic driving control or a cruise control, and an operation position POSsh of a shift lever of the vehicle 10) based on detection values of various sensors and the like (for example, an engine rotating speed sensor 60, an output rotating speed sensor 62, a MG1 rotating speed sensor 64, a MG2 rotating speed sensor 66, an accelerator operation amount sensor 68, a throttle valve opening degree sensor 70, a brake pedal sensor 71, a steering sensor 72, a driver state sensor 73, a G sensor 74, a yaw rate sensor 76, a battery sensor 78, an oil temperature sensor 79, a vehicle surrounding information sensor 80, a vehicle position sensor 81, an external-network communication antenna 82, a navigation system 83, a driving assist setting switch group 84, and a shift position sensor 85) of the vehicle 10.

The acceleration operation amount indicating the magnitude of the acceleration operation by the driver is an accelerator operation amount that is the operation amount of an accelerator operation member such as an accelerator pedal, for example, and is an output amount of the vehicle 10 that is required by the driver. As the output amount that is required by the driver, the throttle valve opening degree θth or the like can be used other than the accelerator operation amount θacc.

The driver state sensor 73 includes, for example, at least one of a camera that photographs the expression, pupil and others of the driver and a biological information sensor that detects biological information about the driver, and acquires the state of the driver, as exemplary by the visual line of the driver, the orientation of the face, the movement of the eyeball and face, and the condition of the heartbeat.

The vehicle surrounding information sensor 80 includes, for example, at least one of a LIDAR, a radar and an in-vehicle camera, and directly acquires information relevant to a road on which the vehicle is traveling, and information relevant to a physical body surrounding the vehicle. The LIDAR includes, for example, a plurality of LIDARs that respectively detects a physical body existing forward of the vehicle 10, a physical body existing lateral to the vehicle 10, a physical body existing rearward of the vehicle 10, and the like, or a single LIDAR that detects a physical body in the periphery of the vehicle 10, and outputs physical body information relevant to the detected physical body, as the vehicle surrounding information Iard. The radar includes, for example, a plurality of radars that respectively detects a physical body existing forward of the vehicle 10, a physical body existing nearly forward of the vehicle 10, a physical body existing nearly rearward of the vehicle 10, and outputs physical body information relevant to the detected physical body, as the vehicle surrounding information Iard. The physical information from the LIDAR or the radar includes the distance and direction of the detected physical body from the vehicle 10. The in-vehicle camera includes, for example, a monocular camera or stereo camera that picks up a forward view or rearward view of the vehicle 10, and outputs pickup information as the vehicle surrounding information Iard. The pickup information includes information about a lane of the traveling road, a traffic sign on the traveling road, a parking space, and another vehicle, a pedestrian and an obstacle on the traveling road.

The vehicle position sensor 81 includes a GPS antenna and the like. The position information Ivp includes vehicle position information indicating the position of the vehicle 10 on the ground or a map based on GPS signals (orbit signals) that are sent from global positioning system (GPS) satellites.

The navigation system 83 is a known navigation system that includes a display, a speaker and the like. The navigation system 83 identifies the vehicle position on previously stored map data, based on the position information Ivp. The navigation system 83 displays the vehicle position on the map displayed on the display. When a destination is input, the navigation system 83 computes a traveling route from a departure place to the destination, and gives instructions of the traveling route and the like to the driver through the display, the speaker and the like. The navigation information Inavi includes, for example, map information such as road information and facility information based on the map data previously stored in the navigation system 83. The road information includes information about the kind of the road such as a city road, a suburban road, a mountain road and an automobile expressway, that is, a freeway, a fork and junction of the road, the slope of the road, and a vehicle speed limit. The facility information includes information about the kind, location, name and others of a place such as a supermarket, a shop, a restaurant, a parking place, a park, a place where the vehicle 10 is repaired, driver's home, and a service area on a freeway. For example, the service area is a place on the highway where there is equipment for parking, food, refueling and the like.

The automatic assist setting switch group 84 includes an automatic driving selection switch for executing the automatic driving control, a cruise switch for executing the cruise control, a switch for setting the vehicle speed in the cruise control, a switch for setting the inter-vehicle distance from a leading vehicle in the cruise control, a switch for executing a lane keeping control in which the vehicle 10 keeps traveling on a set lane, and the like.

The communication signal Scom includes, for example, road traffic information exchanged with a center that is an external device such as a road traffic information communication system and/or inter-vehicle communication information directly exchanged with another vehicle near the vehicle 10 without the center. The road traffic information includes, for example, information about road congestion, an accident, a construction, a necessary time, a parking place and the like. The inter-vehicle communication information includes, for example, vehicle information, traveling information, traffic environment information and the like. The vehicle information includes, for example, information indicating a vehicle type such as a passenger car, a truck and a two-wheel vehicle. The traveling information includes, for example, information about the vehicle speed V, position information, operation information about the brake pedal, blinking information about a turn-signal lamp, and blinking information about a hazard lamp. The traffic environment information includes, for example, information about road congestion, a construction and the like.

The electronic control device 90 outputs various command signals (for example, an engine control command signal Se for controlling the engine 14, a rotating machine control command signal Smg for controlling each of the first rotating machine MG1 and the second rotating machine MG2, an oil pressure control command signal Sat for controlling the operating state of the engagement device CB, an EOP control command signal Seop for controlling the operation of the EOP 58, the communication signal Scom, a brake control command signal Sbra for controlling the braking torque of the wheel brake, a steering control command signal Sste for controlling the steering of wheels (particularly, front wheels), and an information announcement control command signal Sinf for giving a warning or a notice to the driver), to devices (for example, the engine control device 50, the inverter 52, the oil pressure control circuit 56, the motor 59, the external-network communication antenna 82, a wheel brake device 86, a steering device 88, and an information announcement device 89) of the vehicle 10. The oil pressure control command signal Sat is also an oil pressure control command signal for controlling the gear shift of the stepped transmission unit 20, and for example, is a command signal for driving solenoid valves SL1 to SL4 (see FIG. 4 described later) that adjust respective oil pressures Pc1, Pc2, Pb1, Pb2 to be supplied to respective hydraulic actuators for the engagement device CB. The electronic control device 90 sets oil pressure command values corresponding to the values of the oil pressures Pc1, Pc2, Pb1, Pb2, and outputs drive currents or drive voltages corresponding to the oil pressure command values, to the oil pressure control circuit 56.

The wheel brake device 86 is a brake device that gives the braking torque of the wheel brake to the wheels. The wheel brake device 86 supplies a brake oil pressure to a wheel cylinder provided in the wheel brake, for example, in response to driver's pedaling operation of the brake pedal. At normal time, in the wheel brake device 86, a master cylinder oil pressure generated from a brake master cylinder and having a magnitude corresponding to the brake operation amount Bra is supplied to the wheel cylinder, as the brake oil pressure. On the other hand, for example, at the time of an ABS control, a sideslip prevention control, a vehicle speed control, the automatic driving control or the like, in the wheel brake device 86, a brake oil pressure necessary for the control is supplied to the wheel cylinder for the generation of the braking torque of the wheel brake. The above wheels include the drive wheels 28 and unillustrated following wheels.

The steering device 88 gives, for example, an assist torque corresponding to the vehicle speed V, the steering angle θsw, the steering direction Dsw and the yaw rate Ryaw, to a steering system of the vehicle 10. For example, at the time of the automatic driving control, the steering device 88 gives the torque for controlling the steering of the front wheels, to the steering system of the vehicle 10.

The information announcement device 89 is a device that gives a warning or notice to the driver, for example, when some kind of component relevant to the traveling of the vehicle 10 breaks down or when the function of the component decreases. Examples of the information announcement device 89 include a display device such as a monitor, a display and an alarm lamp and/or a sound output device such as a speaker and a buzzer. The display device is a device that gives a visual warning or notice to the driver. The sound output device is a device that gives an auditory warning or notice to the driver.

Figure 4:
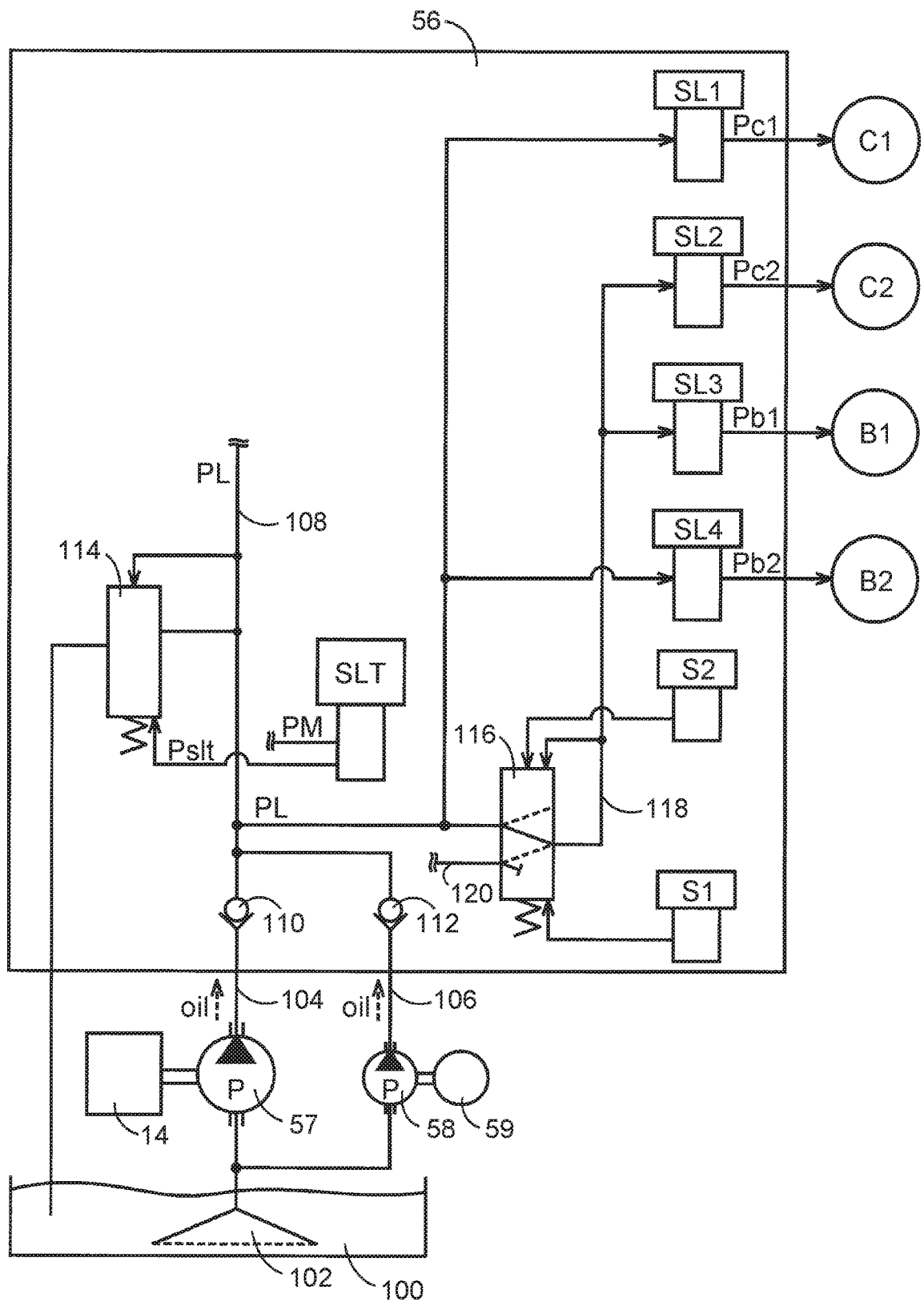
FIG. 4 is a diagram for describing an oil pressure control circuit, and is a diagram for describing an oil pressure source that supplies an operating oil to the oil pressure control circuit.

FIG. 4 is a diagram for describing the oil pressure control circuit 56, and is a diagram for describing an oil pressure source that supplies the operating oil (oil) to the oil pressure control circuit 56. In FIG. 4, the MOP 57 and the EOP 58 are provided in parallel because of the configuration of an oil passage through which the operating oil (oil) flows. Each of the MOP 57 and the EOP 58 discharges the operating oil (oil) that is an oil pressure source for switching each operating state of the engagement device CB or supplying a lubricant to parts of the dynamic power transmitting device 12. The MOP 57 and the EOP 58 sucks up the operating oil (oil) that is returned in an oil pan 100 provided at a lower portion of the case 16, through a strainer 102 that is a common suction port, and discharges the operating oil (oil) to respective discharge oil passages 104, 106. Each of the discharge oil passage 104, 106 is coupled to an oil passage of the oil pressure control circuit 56, for example, to a line pressure oil passage 108 that is an oil passage through which a line pressure PL flows. The discharge oil passage 104 into which the operating oil (oil) is discharged from the MOP 57 is coupled to the line pressure oil passage 108 through an MOP check valve 110 of the oil pressure control circuit 56. The discharge oil passage 106 into which the operating oil (oil) is discharged from the EOP 58 is coupled to the line pressure oil passage 108 through an EOP check valve 112 of the oil pressure control circuit 56. The MOP 57 generates the operating oil pressure by rotating together with the engine 14. The EOP 58 generates the operating oil pressure by being rotated by the motor 59. The EOP 58 can generate the operating oil pressure regardless of the rotating state of the engine 14. For example, the EOP 58 operates during the traveling in the motor traveling mode.

In addition to the line pressure oil passage 108, the MOP check valve 110 and the EOP check valve 112, the oil pressure control circuit 56 includes a regulator valve 114, a switching valve 116, a supply oil passage 118, an ejection oil passage 120, solenoid valves SLT, S1, S2, SL1 to SL4, and the like.

The regulator valve 114 adjusts the line pressure PL, using the operating oil (oil) that is discharged by at least one of the MOP 57 and the EOP 58. The solenoid valve SLT is a linear solenoid valve, for example, and is controlled by the electronic control device 90, so as to output a pilot pressure Pslt corresponding to the torque input to the stepped transmission unit 20 and the like to the regulator valve 114. Thereby, the line pressure PL becomes an oil pressure corresponding to the torque input to the stepped transmission unit 20 and the like. The source pressure to be input to the solenoid valve SLT is, for example, a modulator pressure PM after the line pressure PL as the source pressure is adjusted to a certain value by an unillustrated modulator valve.

The switching valve 116 switches the oil passage based on the oil pressures that are output from the solenoid valves S1, S2. Each of the solenoid valves S1, S2 is an on-off solenoid valve, for example, and is controlled by the electronic control device 90, so as to output the oil pressure to the switching valve 116. In a state where the oil pressure is output from the solenoid valve S2 and the oil pressure is not output from the solenoid valve S1, the switching valve 116 switches the oil passage so as to connect the line pressure oil passage 108 and the supply oil passage 118. In a state where the oil pressure is output from both of the solenoid valves S1, S2, where the oil pressure is output from neither of the solenoid valves S1, S2, or where the oil pressure is output from the solenoid valve S1 and the oil pressure is not output from the solenoid valve S2, the switching valve 116 blocks the oil passage between the line pressure oil passage 108 and the supply oil passage 118, and switches the oil passage so as to connect the supply oil passage 118 to the ejection oil passage 120. The supply oil passage 118 is an oil passage through which the source pressure to be input to the solenoid valves SL2, SL3 flows. The ejection oil passage 120 is an atmospheric relief passage through which the operating oil (oil) in the oil pressure control circuit 56 is ejected to the exterior of the oil pressure control circuit 56, that is, an atmospheric relief passage through which the operating oil (oil) is returned to the oil pan 100. For example, in the case where the operation position POSsh is a D operation position for selecting an advance traveling position of the composite transmission 40 that allows the advance traveling of the vehicle 10, the electronic control device 90 outputs the oil pressure control command signal Sat to the oil pressure control circuit 56 such that the solenoid valve S2 outputs the oil pressure and the solenoid valve S1 does not output the oil pressure. For example, in the case where the operation position POSsh is an R operation position for selecting a reverse traveling position of the composite transmission 40 that allows the reverse traveling of the vehicle 10, the electronic control device 90 outputs the oil pressure control command signal Sat to the oil pressure control circuit 56 such that each of the solenoid valves S1, S2 outputs the oil pressure.

The solenoid valves SL1 to SL4 each are linear solenoid valves, for example, and are controlled by the electronic control device 90, so as to output the respective oil pressures Pc1, Pc2, Pb1, Pb2 to the respective hydraulic actuators for the engagement device CB. The solenoid valve SL1 adjusts the C1 oil pressure Pc1 to be supplied to the hydraulic actuator for the clutch C, using the line pressure PL as the source pressure. The solenoid valve SL2 adjusts the C2 oil pressure Pc2 to be supplied to the hydraulic actuator for the clutch C2, using the line pressure PL on the downstream side of the switching valve 116 as the source pressure. The solenoid valve SL3 adjusts the B1 oil pressure Pb1 to be supplied to the hydraulic actuator for the brake B1, using the line pressure PL on the downstream side of the switching valve 116 as the source pressure. The solenoid valve SL4 adjusts the B2 oil pressure Pb2 to be supplied to the hydraulic actuator for the brake B2, using the line pressure PL as the source pressure.

Figure 5:
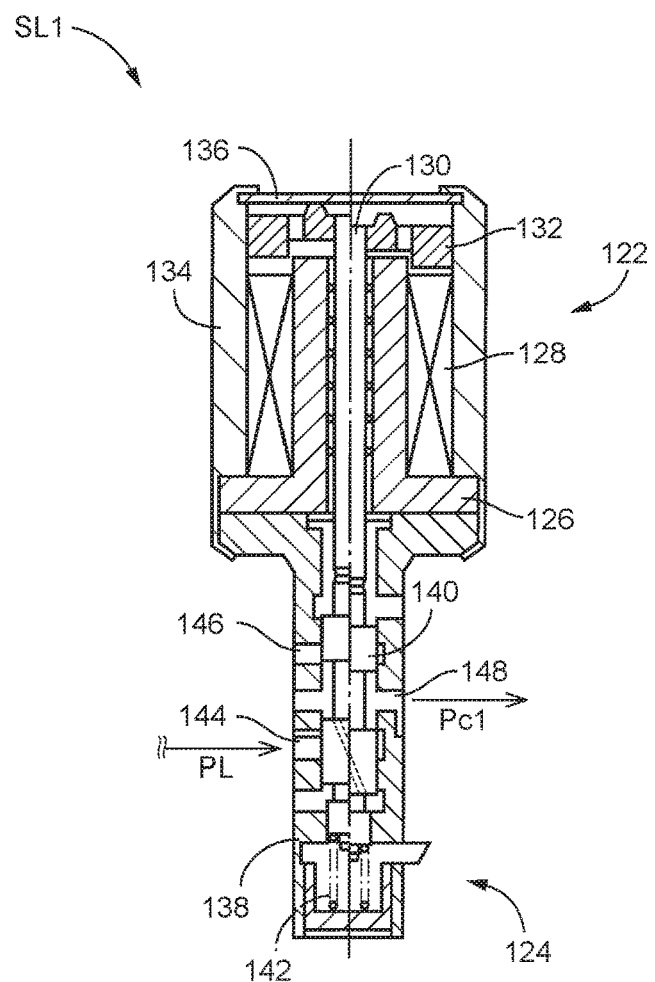
FIG. 5 is a sectional view for describing a configuration of a linear solenoid valve that is provided on the oil pressure control circuit in FIG. 4 and that adjusts the oil pressure to be supplied to an engagement device.
Figure 6:
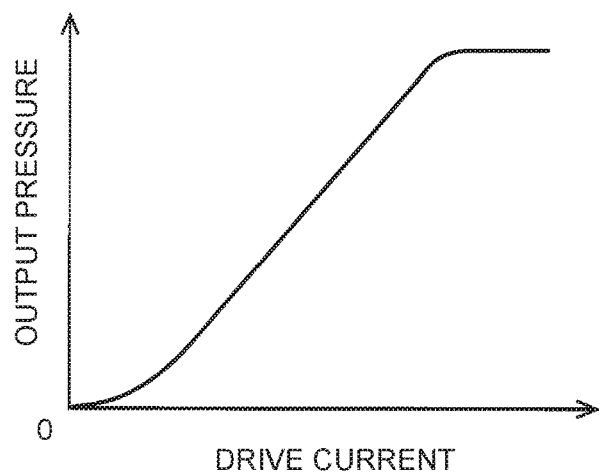
FIG. 6 is a diagram showing an example of a valve characteristic of the linear solenoid valve in FIG. 5.

FIG. 5 is a sectional view for describing configurations of the solenoid valves SL1 to SL4. The solenoid valves SL1 to SL4 basically has the same configuration. Therefore, the solenoid valve SL1 will be described as an example. The solenoid valve SL1 includes a solenoid 122 that converts electric energy into drive force by energization, and a pressure adjustment unit 124 that adjusts the line pressure PL by the drive of the solenoid 122 and generates the C1 oil pressure Pc1. The solenoid 122 includes a cylindrical winding core 126, a coil 128 in which a conducting wire is wound around the outer circumference of the winding core 126, a core 130 that is provided so as to be capable of moving within the winding core 126 in the shaft center direction, a plunger 132 that is fixed to an end portion of the core 130 on the opposite side of the pressure adjustment unit 124, a case 134 that contains the winding core 126, the coil 128, the core 130 and the plunger 132, and a cover 136 that is fit in an opening of the case 134. The pressure adjustment unit 124 includes a sleeve 138 that is fit in the case 134, a spool valve element 140 that is provided so as to be capable of moving within the sleeve 138 in the shaft center direction, and a spring 142 that biases the spool valve element 140 to the side of the solenoid 122. An end portion of the spool valve element 140 on the side of the solenoid 122 abuts on an end portion of the core 130 on the side of the pressure adjustment unit 124. In the solenoid valve SL1 configured in this way, when the drive current flows through the coil 128, the plunger 132 moves in the common shaft center direction of the core 130 and the spool valve element 140, depending on the magnitude of the drive current, and therewith, the core 130 and the spool valve element 140 move in the shaft center direction. Thereby, the flow rate of the operating oil (oil) to be input from an input port 144 and the flow rate of the operating oil (oil) to be ejected from a drain port 146 are adjusted. Further, the line pressure PL to be input to the input port 144 is adjusted, for example, in accordance with a valve characteristic of the linear solenoid valve that is a preset relation between the drive current and the output pressure shown in FIG. 6, and the C1 oil pressure Pc1 after the adjustment is output from the output port 148.

Figure 7:
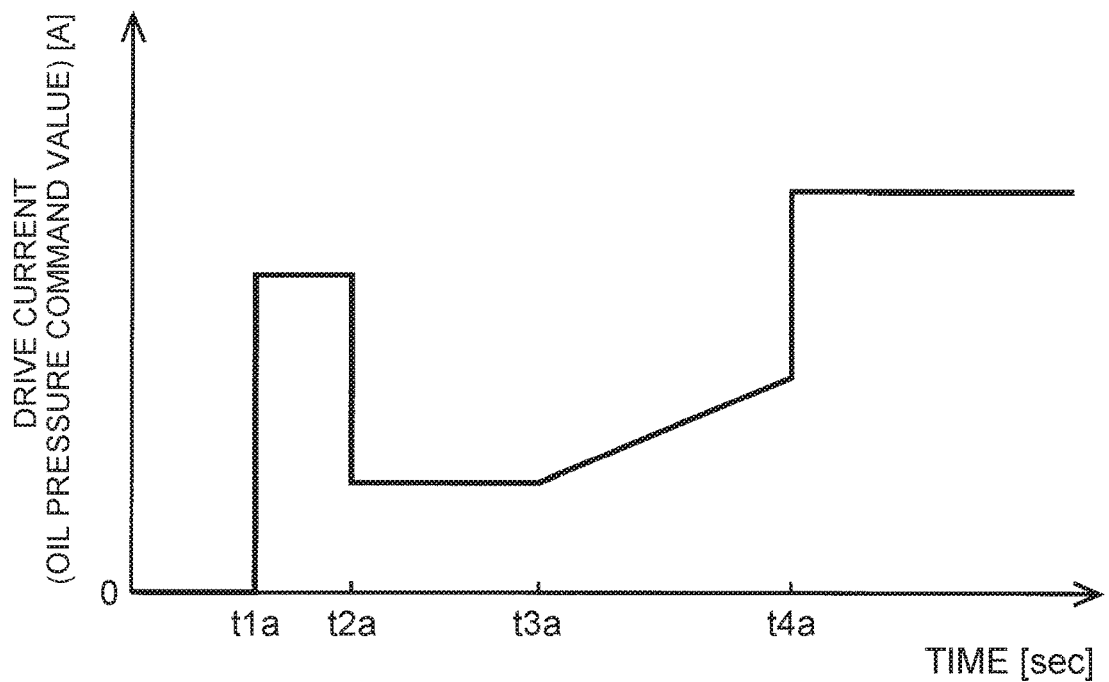
FIG. 7 is a diagram for describing an example of drive current for the solenoid valve while a frictional engagement device is being engaged in a gear shift control of the stepped transmission unit.

FIG. 7 is a diagram for describing an example of the drive current corresponding to the oil pressure command value to the solenoid valve SL that adjusts the oil pressure of the frictional engagement device on the engagement side while the frictional engagement device is being engaged in the gear shift control of the stepped transmission unit 20. In FIG. 7, time t1a is a time when the output of the oil pressure control command signal Sat to the frictional engagement device on the engagement side is started in the gear shift control of the stepped transmission unit 20. In a quick applying section after the start of the output of the oil pressure control command signal Sat and before time t2a, the drive current is rapidly increased. Next, in a constant-pressure waiting section before time t3a, the drive current value is kept at a magnitude for setting the engagement pressure of the frictional engagement device on the engagement side to a constant waiting pressure immediately before the engagement. Next, in a sweep period before a synchronization determination that the MG2 rotating speed Nm or the engine rotating speed Ne has been synchronized with the rotating speed after the gear shift, the drive current value for slowly increasing the engagement pressure of the frictional engagement device on the engagement side is output (see time t3a to time t4a). After the synchronization determination is made, the drive current value is increased to the maximum (see time t4a).

Back to FIG. 1, the vehicle 10 further includes a transceiver 150, a first gateway ECU 152, a second gateway ECU 154, a connector 156 and the like.

The transceiver 150 is a device that communicates with a server 200 that is an external device for the vehicle different from the vehicle 10, provided separately from the vehicle 10. The server 200 is a system on a network in the exterior of the vehicle 10. The server 200 accepts, processes, analyzes, accumulates and provides a variety of information such as vehicle state information and vehicle phenomenon information. The server 200 exchanges a variety of information not only with the vehicle 10 but also with other vehicles. The transceiver 150 may have a function to communicate directly with another vehicle near the vehicle 10 without the server 200. For example, the vehicle state information is information indicating a traveling state that is relevant to the traveling of the vehicle 10 and that is detected by various sensors and the like, that is, a behavior state of the vehicle 10. For example, the traveling state includes the accelerator operation amount θacc, the vehicle speed V, and the like. For example, the vehicle phenomenon information is information indicating a phenomenon that occurs in the vehicle 10. For example, the phenomenon is a sound, that is, a sound pressure within the vehicle that is detected by an unillustrated microphone, a vibration that a passenger feels and that is detected by the G sensor 74, and the like. Further, wireless communication may be performed with the server 200 through the external-network communication antenna 82.

Each of the first gateway ECU 152 and the second gateway ECU 154 has the same hardware configuration as the electronic control device 90, and for example, is a relay device that is provided for rewriting a program and/or data stored in a rewritable ROM within the electronic control device 90. The first gateway ECU 152 is connected to the transceiver 150, and rewrites the program stored in the above ROM within the electronic control device 90, using the wireless communication between the transceiver 150 and the server 200, for example. The server 200 functions as a software delivery center that delivers a program for rewriting. The second gateway ECU 154 can be mechanically coupled to an external rewriting device 210 that is an external device provided separately from the vehicle 10 through the connector 156, and rewrites the program stored in the above ROM within the electronic control device 90, using the external rewriting device 210, for example.

For realizing various controls in the vehicle 10, the electronic control device 90 includes AT gear shift control means, that is, an AT gear shift control unit 92, hybrid control means, that is, a hybrid control unit 94, and driving control means, that is, a driving control unit 96.

Figure 8:
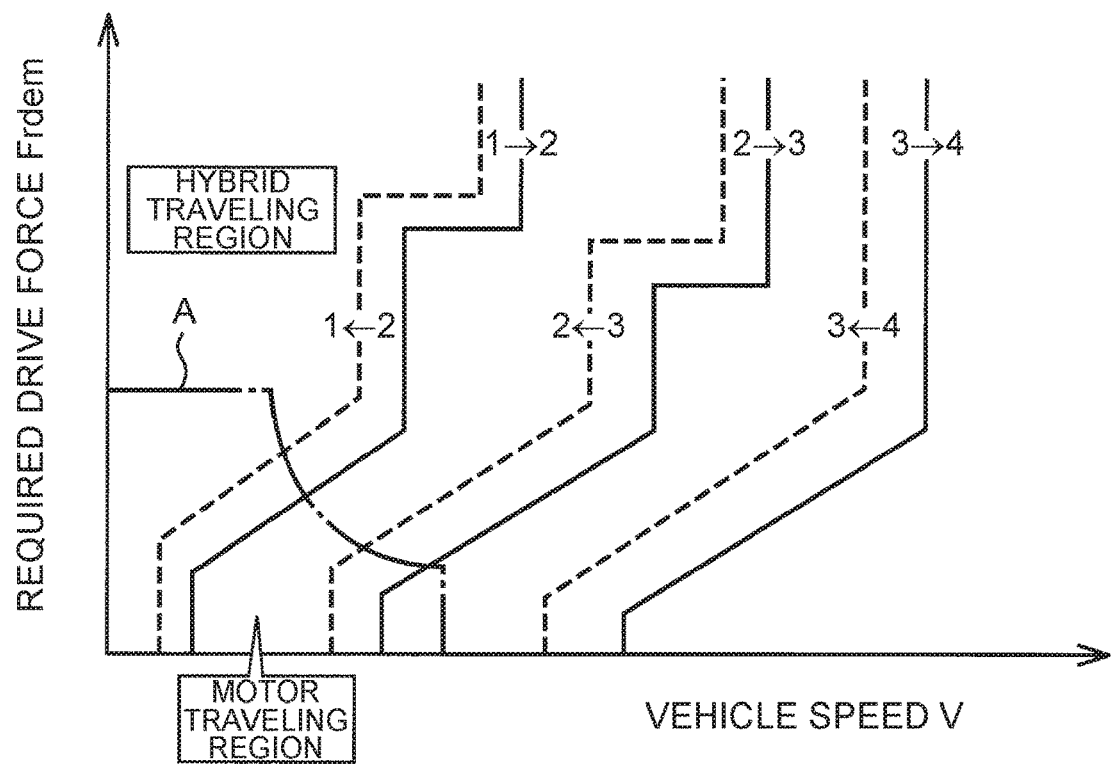
FIG. 8 is a diagram showing an example of a gear shift map that is used for the gear shift control of the stepped transmission unit and an example of a dynamic power source switching map that is used for a switching control between a hybrid traveling and a motor traveling, and is a diagram showing a relation between the gear shift map and the dynamic power source switching map.

The AT gear shift control unit 92 performs a gear shift determination for the stepped transmission unit 20, using an AT gear stage shift map in FIG. 8 that shows a relation previously evaluated and stored by experiments or from designs, that is, a preset relation, and as necessary, outputs the oil pressure control command signal Sat for executing the gear shift control of the stepped transmission unit 20, to the oil pressure control circuit 56. For example, the AT gear stage shift map shows a predetermined relation in which gear shift lines for determination of the gear shift of the stepped transmission unit 20 are on a two-dimensional coordinate having the vehicle speed V and the required drive force Frdem as variables. Here, the output rotating speed No or the like may be used instead of the vehicle speed V, and a required drive torque Trdem, an accelerator operation amount θacc, the throttle valve opening degree θth or the like may be used instead of the required drive force Frdem. The gear shift lines on the AT gear stage shift map include upshift lines for determination of upshift, which are shown as solid lines, and downshift lines for determination of downshift, which are shown as broken lines.

The hybrid control unit 94 includes a function as engine control means for controlling the operation of the engine 14, that is, a function as an engine control unit, and a function as rotating control means for controlling the operation of the first rotating machine MG1 and the second rotating machine MG2 through the inverter 52, that is, a function as a rotating machine control unit, and executes a hybrid drive control and the like with the engine 14, the first rotating machine MG1 and the second rotating machine MG2, by these control functions. The hybrid control unit 94 applies the accelerator operation amount θacc and the vehicle speed V, for example, to a drive requirement map indicating a preset relation, and thereby calculates the required drive force Frdem of the drive wheels 28 as the drive requirement. As the drive requirement, the required drive torque Trdem [Nm] of the drive wheels 28, a required drive power Prdem [W] of the drive wheels 28, a required AT output torque of the output shaft 22, or the like can be used other than the required drive force Frdem [N].

The hybrid control unit 94 outputs the engine control command signal Se that is a command signal for controlling the engine 14, and the rotating machine control command signal Smg that is a command signal for controlling the first rotating machine MG1 and the second rotating machine MG2, so as to realize the required drive power Prdem based on the required drive torque Trdem and the vehicle speed V, in view of a chargeable electric power Win and dischargeable electric power Wout of the battery 54. For example, the engine control command signal Se is a command value of an engine power Pe as the power of the engine 14 that outputs the engine torque Te at the engine rotating speed Ne at that time. For example, the rotating machine control command signal Smg is a command value of the generated electric power Wg of the first rotating machine MG1 that outputs the MG1 torque Tg at the MG1 rotating speed Ng at the time of command output of the reaction torque of the engine torque Te and is a command value of a consumed electric power Wm of the second rotating machine MG2 that outputs the MG2 torque Tm at the MG2 rotating speed Nm at the time of command output.

The chargeable electric power Win of the battery 54 is an input-allowing electric power that specifies the limit of the input electric power of the battery 54, and the dischargeable electric power Wout of the battery 54 is an output-allowing electric power that specifies the limit of the output electric power of the battery 54. The chargeable electric power Win and dischargeable electric power Wout of the battery 54 is calculated by the electronic control device 90, for example, based on the battery temperature THbat and a charge state value SOC [%] of the battery 54. The charge state value SOC of the battery 54 is a value indicating the charge state of the battery 54, and is calculated by the electronic control device 90, for example, based on the battery charge-discharge current Ibat, the battery voltage Vbat and the like.

For example, in the case where the continuously variable transmission unit 18 operates as a continuously variable transmission and the whole of the composite transmission 40 operates as a continuously variable transmission, the hybrid control unit 94 controls the engine 14 and the generated electric power Wg of the first rotating machine MG1, such that the engine rotating speed Ne and the engine torque Te give the engine power Pe that realizes the required drive power Prdem, in view of an optimal engine fuel efficiency point and the like. Thereby, the hybrid control unit 94 executes a stepless gear shift control of the continuously variable transmission unit 18, and changes the gear ratio γ0 of the continuously variable transmission unit 18. As a result of this control, the gear ratio γt of the composite transmission 40 that operates as a continuously variable transmission is controlled.

For example, in the case where the continuously variable transmission unit 18 performs the gear shift like a stepped transmission and the whole of the composite transmission 40 performs the gear shift like a stepped transmission, the hybrid control unit 94 performs a gear shift determination for the composite transmission 40, for example, using a simulated gear stage shift map indicating a preset relation, and executes the gear shift control of the continuously variable transmission unit 18 so as to selectively establish one of the plurality of simulated gear stages, in coordination with the gear shift control of the AT gear stage of the stepped transmission unit 20 by the AT gear shift control unit 92. Each simulated gear stage can be established, when the first rotating machine MG1 controls the engine rotating speed Ne depending on the vehicle speed V, such that the corresponding gear ratio γt can be kept. The gear ratio γt of the simulated gear stage does not need to be a constant value over the whole range of the vehicle speed V, and may be changed in a predetermined range. Further, limitation may be put, for example, by an upper limit or lower limit of the rotating speed of each part. In this way, the hybrid control unit 94 can perform the gear shift control to change the engine rotating speed Ne like a stepped transmission. The simulated stepped gear shift control in which the whole of the composite transmission 40 performs the gear shift like a stepped transmission may be executed in preference to the stepless gear shift control in which the whole of the composite transmission 40 operates as a continuously variable transmission, for example, only in the case where the driver selects a traveling performance-oriented traveling mode such as a sport traveling mode, or where the required drive torque Trdem is relatively high. Alternatively, the simulated stepped gear shift control may be basically executed, except during a predetermined execution limitation.

The hybrid control unit 94 selectively establishes the motor traveling mode or the hybrid traveling mode, as the traveling mode, depending on the traveling state. For example, in a motor traveling region in which the required drive power Prdem is lower than a preset threshold, the hybrid control unit 94 establishes the motor traveling mode. On the other hand, in a hybrid traveling region in which the required drive power Prdem is equal to or high than the preset threshold, the hybrid control unit 94 establishes the hybrid traveling mode. A chain line A in FIG. 8 is a border line for determining whether the dynamic power source for the traveling of the vehicle 10 is at least the engine 14 or only the second rotating machine MG2. That is, the chain line A in FIG. 8 is a border line between the hybrid traveling region and the motor traveling region for the switching between the hybrid traveling and the motor traveling. The preset relation having the border line shown as the chain line A in FIG. 8 is an example of a dynamic power source switching map configured as a two-dimensional coordinate having the vehicle speed V and the required drive force Frdem as variables. For convenience, in FIG. 8, the dynamic power source switching map is shown together with the AT gear stage shift map.

Even when the required drive power Prdem is in the motor traveling region, the hybrid control unit 94 establishes the hybrid traveling mode in the case where the charge state value SOC of the battery 54 is lower than a preset engine start threshold. In the motor traveling mode, the vehicle 10 travels while the engine 14 is in the stop state and the second rotating machine MG2 generates the drive torque. In the hybrid traveling mode, the vehicle 10 travels while the engine 14 is working. The engine start threshold is a preset threshold indicating a charge state value SOC at which it is necessary to forcibly start the engine 14 and charge the battery 54.

In the case where the hybrid control unit 94 establishes the hybrid traveling mode during the stop of the working of the engine 14, the hybrid control unit 94 performs a start control to start the engine 14. At the start of the engine 14, the hybrid control unit 94 starts the engine 14 by increasing the engine rotating speed Ne with the first rotating machine MG1 and performing ignition when the engine rotating speed Ne becomes equal to or higher than a predetermined rotating speed allowing the ignition. That is, the hybrid control unit 94 starts the engine 14 by cranking the engine 14 with the first rotating machine MG1.

The driving control unit 96 can performs, as driving controls of the vehicle 10, a manual driving control in which the vehicle 10 travels based on driver's driving operation, and a driving assist control in which the vehicle 10 drives without driver's driving operation. The manual driving control is a driving control by which the vehicle 10 travels while performing a manual driving based on driver's driving operation. The manual driving is a driving method in which the vehicle 10 performs an ordinary traveling based on driver's driving operation such as an accelerator operation, a brake operation and a steering operation. For example, the driving assist control is a driving control by which the vehicle 10 travels with a driving assist for automatically assisting the driving operation. The driving assist is a driving method in which the vehicle 10 travels while acceleration, deceleration, braking and the like are automatically performed by the control from the electronic control device 90 based on signals, information and the like from various sensors regardless of driver's driving operation (intention). For example, the driving assist control is an automatic driving control to automatically set a target traveling state based on the destination, map information and others input by the driver, and to automatically perform acceleration, deceleration, braking, steering and like based on the target traveling state. In a broad sense, the driving assist control may include a cruise control in which some driving operations including the steering operation are performed by the driver and acceleration, deceleration, braking and the like are automatically performed.

In the case where the automatic driving selection switch, the cruise switch and the like of the driving assist setting switch group 84 are turned off so that the driving with the driving assist is not selected, the driving control unit 96 establishes a manual driving mode, and executes the manual driving control. The driving control unit 96 executes the manual driving control, by outputting commands for controlling the stepped transmission unit 20, the engine 14 and the rotating machines MG1, MG2, to the AT gear shift control unit 92 and the hybrid control unit 94.

In the case where the automatic driving selection switch of the driving assist setting switch group 84 is operated by the driver so that the automatic driving is selected, the driving control unit 96 establishes an automatic driving mode, and executes the automatic driving control. Specifically, the driving control unit 96 automatically sets the target traveling state, based on the destination input by the driver, the vehicle position information based on the position information Ivp, the map information based on the navigation information Inavi and the like, a variety of information about the traveling road based on the vehicle surrounding information Iard, and the like. The driving control unit 96 performs the automatic driving control such that acceleration, deceleration, braking and steering are automatically performed based on the set target traveling state, by outputting the commands for controlling the stepped transmission unit 20, the engine 14 and the rotating machines MG1, MG2 to the AT gear shift control unit 92 and the hybrid control unit 94, outputting the brake control command signal Sbra for obtaining a necessary braking torque to the wheel brake device 86, and outputting the steering control command signal Sste for controlling the steering of the front wheels to the steering device 88.

In the vehicle 10, some kind of malfunction can occur. For example, the malfunction that occurs in the vehicle 10 is a faulty gear shift of the stepped transmission unit 20 as a vehicle transmission. Examples of the faulty gear shift of the stepped transmission unit 20 include a faulty gear shift due to a faulty operation of the solenoid valves SL1 to SL4 and the like in the oil pressure control circuit 56, a faulty gear shift due to decrease in durability of a friction material of the engagement device CB, and a faulty gear shift due to a temporary faulty operation of the engagement device CB that is caused by increase in the temperature of the friction material of the engagement device CB.

Figure 9:
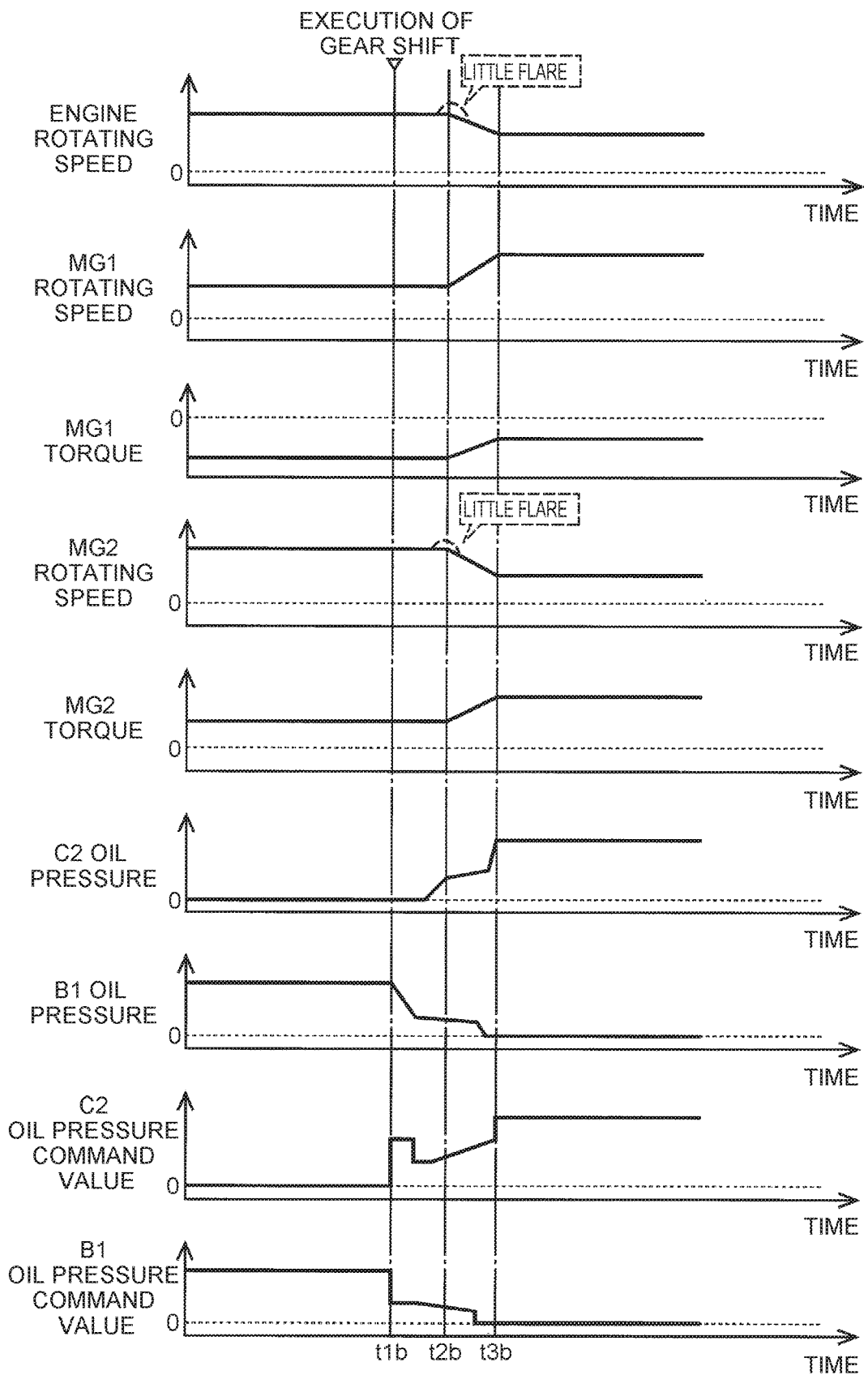
FIG. 9 is a time chart for describing an example of a faulty gear shift of the stepped transmission unit.

FIG. 9 is a time chart for describing an example of the faulty gear shift of the stepped transmission unit 20. In FIG. 9, a period after time t1b and before time t3b is a transition in which 2→3 upshift of the stepped transmission unit 20 is being executed. During a transition of the gear shift control of the stepped transmission unit 20, a learning control for reducing a flare (racing) of the engine rotating speed Ne or MG2 rotating speed Nm is executed. That is, the learning control is executed and the oil pressure command value is corrected, such that a flare amount (a racing amount) of the engine rotating speed Ne or MG2 rotating speed Nm during the transition of the clutch-to-clutch gear shift of the stepped transmission unit 20 falls within a little flare amount range. The flare is a phenomenon in which, for example, the engine rotating speed Ne or the MG2 rotating speed Nm increases with respect to a rotating speed based on the gear ratio γat and output rotating speed No of the stepped transmission unit 20, and the flare amount is the amount of the increase in rotating speed at the time of occurrence of the flare. Specifically, in the case where the flare of the engine rotating speed Ne or MG2 rotating speed Nm has occurred during the transition of the gear shift control (around time t2b), the initial oil pressure of the C2 oil pressure that is the oil pressure of the engagement side in the next 2→3 upshift is set to a high oil pressure when the flare amount is large, and the initial oil pressure of the C2 oil pressure in the next 2→3 upshift is set to a low oil pressure when the flare amount is almost zero or very small. In the case where a flare amount anomaly has occurred after the completion of the learning control for causing the flare amount of the engine rotating speed Ne or MG2 rotating speed Nm to fall within the little flare amount range by the correction of the oil pressure command value, it is determined that the faulty gear shift of the stepped transmission unit 20 has occurred. The flare amount anomaly is an anomaly in which the flare amount becomes equal to or larger than a predetermined flare amount. For example, the predetermined flare amount is a preset flare malfunction determination value for determining the occurrence of a flare that leads to the faulty gear shift of the stepped transmission unit 20. Further, in the case where a tie-up by which the flare amount becomes almost zero or very small has occurred after the completion of the learning control, it is determined that the faulty gear shift of the stepped transmission unit 20 has occurred. In the learning control, the oil pressure command value may be corrected such that the flare time falls within a predetermined flare time, instead of the flare amount.

When the flare amount anomaly or the tie-up has occurred, a gear shift shock sometimes appears. In the case where a gear shift shock in which the front-rear acceleration Gx becomes equal to or higher than a predetermined acceleration after the completion of the learning control in the gear shift control of the stepped transmission unit 20, it is determined that the faulty gear shift of the stepped transmission unit 20 has occurred. The predetermined acceleration is a preset threshold for determining the occurrence of the front-rear acceleration Gx that leads to the faulty gear shift of the stepped transmission unit 20.

In the case where the faulty gear shift of the stepped transmission unit 20 is due to the faulty operation of the solenoid valves SL1 to SL4 and the like, the cause for the malfunction is identified more easily based on output pressures of the solenoid valves SL1 to SL4 and the like, for example, the oil pressures Pc1, Pc2, Pb1, Pb2, than based on the engine rotating speed Ne or the MG2 rotating speed Nm. Each of the oil pressures Pc1, Pc2, Pb1, Pb2 is the oil pressure of the operating oil (oil) for switching the operating state of the engagement device CB. However, the vehicle 10 is not equipped with oil pressure sensors that detect the values of the oil pressures Pc1, Pc2, Pb1, Pb2. Therefore, there is fear of decrease in the accuracy of the identification of the cause for the malfunction.

A vehicle malfunction cause identifying device 300 (see FIG. 1) that is an external device provided separately from the vehicle 10 identifies the cause for the malfunction in the vehicle 10 using the detection value of an in-vehicle sensor that is equipped in the vehicle 10 and that detects a behavior state of the vehicle 10, when the malfunction has occurred in the vehicle 10. For improving the accuracy of the identification of the cause for the malfunction in the vehicle 10, the vehicle malfunction cause identifying device 300 has a malfunction cause identifying model 310 based on the detection value of the second sensor. The malfunction cause identifying model 310 is preset using a second vehicle equipped with a first sensor that is the same as the in-vehicle sensor equipped in the vehicle 10 and a second sensor that is not equipped in the vehicle 10. The vehicle malfunction cause identifying device 300 identifies the cause for the malfunction in the vehicle 10, using the malfunction cause identifying model 310 and the detection value of the in-vehicle sensor equipped in the vehicle 10. The vehicle malfunction cause identifying device 300 is connected to the server 200 through wireless communication, and acquires the detection value of the in-vehicle sensor equipped in the vehicle 10, from the server 200. As necessary, the vehicle 10 sends the detection value of the in-vehicle sensor equipped in the vehicle 10, to the server 200.

The in-vehicle sensor equipped in the vehicle 10 is an in-vehicle sensor group 160 that detects the behavior state of the vehicle 10, and includes the engine rotating speed sensor 60, the output rotating speed sensor 62, the MG1 rotating speed sensor 64, the MG2 rotating speed sensor 66, the accelerator operation amount sensor 68, the G sensor 74, and the like. For example, the second vehicle is an experimental vehicle 400 (see FIG. 1). The first sensor is an in-vehicle sensor group 402 that is the same as the in-vehicle sensor group 160. For example, the second sensor is an experimental vehicle sensor 404 such as oil pressure sensors that detect the values of the oil pressures Pc1, Pc2, Pb1, Pb2. Basically, the experimental vehicle 400 has the same configuration as the vehicle 10, which is a mass-produced vehicle.

Figure 10:
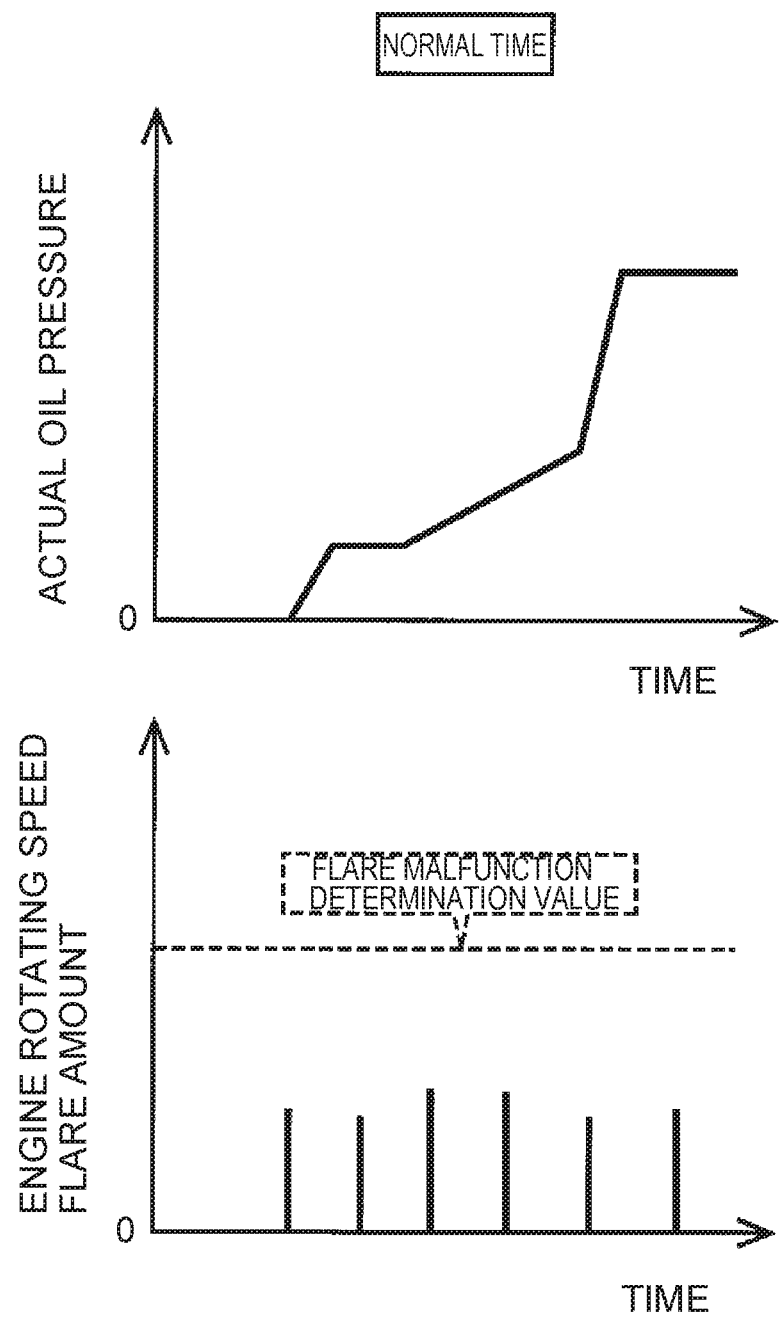
FIG. 10 is a diagram for describing an example of a malfunction that occurs when an engagement pressure is directly controlled by the solenoid valve, and shows a case of a normal time.
Figure 11:
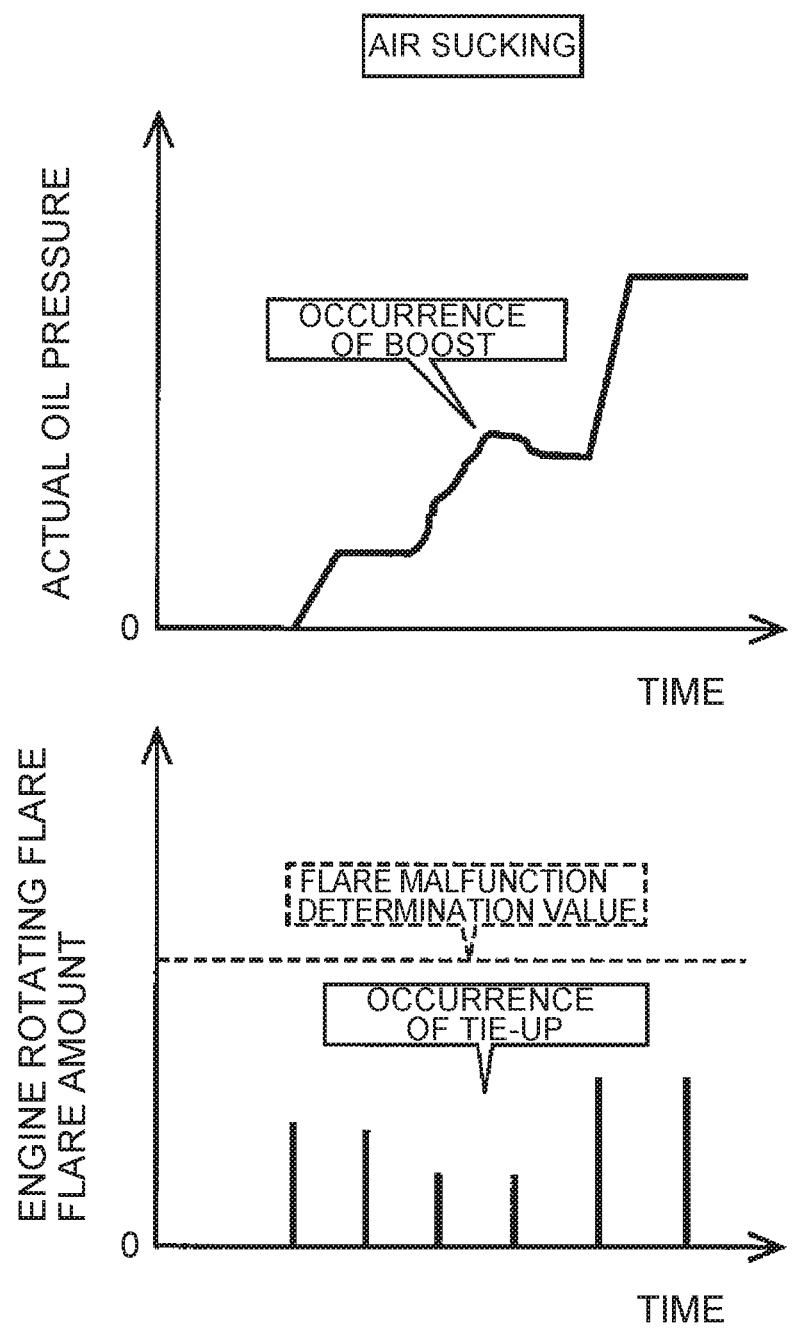
FIG. 11 is a diagram for describing an example of the malfunction that occurs when the engagement pressure is directly controlled by the solenoid valve, and shows a case of an air sucking.
Figure 12:
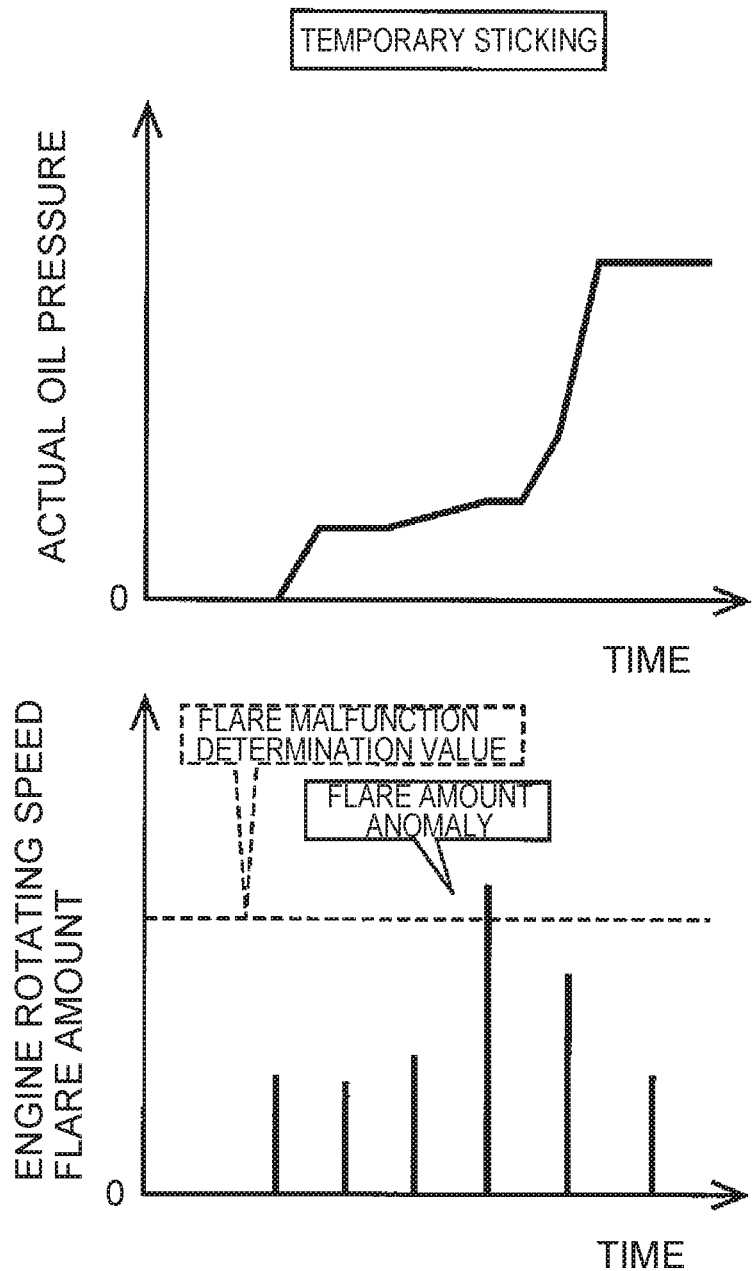
FIG. 12 is a diagram for describing an example of the malfunction that occurs when the engagement pressure is directly controlled by the solenoid valve, and shows a case of a temporary sticking.
Figure 13:
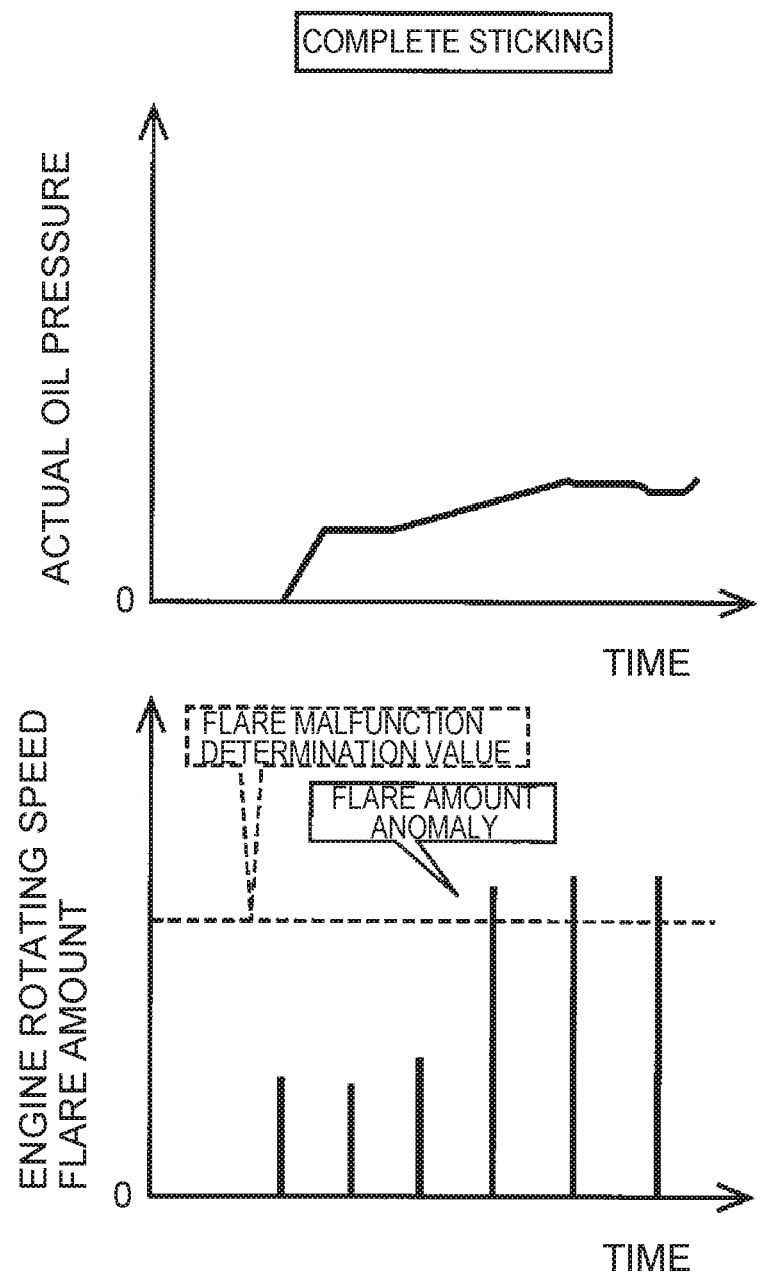
FIG. 13 is a diagram for describing an example of the malfunction that occurs when the engagement pressure is directly controlled by the solenoid valve, and shows a case of a complete sticking.

Each of FIG. 10, FIG. 11, FIG. 12 and FIG. 13 is a diagram for describing an example of a malfunction that occurs when the oil pressures Pc1, Pc2, Pb1, Pb2 are directly controlled by the solenoid valves SL1 to SL4. For example, the experimental vehicle 400 can detect the actual values of the oil pressures Pc1, Pc2, Pb1, Pb2, in addition to the flare amount of the engine rotating speed Ne during the transition of the gear shift control of the stepped transmission unit 20. Each of FIG. 10, FIG. 11, FIG. 12 and FIG. 13 shows the actual value (see "actual oil pressure" in the figure) of the C2 oil pressure Pc2 and the flare amount of the engine rotating speed Ne during the clutch-to-clutch gear shift of the stepped transmission unit 20. FIG. 10 shows the characteristic of the C2 oil pressure Pc2 and the flare amount of the engine rotating speed Ne at normal time. FIG. 11 shows the characteristic of the C2 oil pressure Pc2 and the flare amount of the engine rotating speed Ne at the time of a boost due to an air sucking of the solenoid valve SL2. FIG. 12 shows the characteristic of the C2 oil pressure Pc2 and the flare amount of the engine rotating speed Ne at the time of a temporary sticking of the solenoid valve SL2 due to foreign matter contamination. FIG. 13 shows the characteristic of the C2 oil pressure Pc2 and the flare amount of the engine rotating speed Ne at the time of a complete sticking of the solenoid valve SL2 due to foreign matter contamination. As shown in FIG. 10, FIG. 11, FIG. 12 and FIG. 13, the cause for the faulty gear shift such as the complete sticking of the solenoid valve SL2 is identified more easily by using the actual value of the C2 oil pressure Pc2, than by using the flare amount of the engine rotating speed Ne. In the experimental vehicle 400, the actual values of the oil pressures Pc1, Pc2, Pb1, Pb2 are detected, and therefore, the malfunction is relatively easily identified by using the actual values. In this way, in the experimental vehicle 400, it is possible to perform the identification of the cause for detection value data of the in-vehicle sensor group 402. That is, in the experimental vehicle 400, it is possible to identify the cause for the malfunction, based on the detection value of the experimental vehicle sensor 404 allowing the cause for the malfunction in the experimental vehicle 400 to be identified more easily than the detection value of the in-vehicle sensor group 402.

The in-vehicle sensor group 160 of the vehicle 10 includes different kinds of sensors to some extent, although the number of the sensors is limited. A supervised machine learning is performed on the basis of the in-vehicle sensor group 160 of the vehicle 10, while data of the detection value of the in-vehicle sensor group 402 when the malfunction has occurred is adopted as the input side and the cause for the malfunction is adopted as the output side.

Specifically, the vehicle malfunction cause identifying device 300 is configured to include a so-called microcomputer having a CPU, a RAM, a ROM and an input-output interface, for example. The CPU executes various controls by performing signal processing in accordance with programs previously stored in the ROM while using a temporary storage function of the RAM. The vehicle malfunction cause identifying device 300 includes a computation unit 302, a display unit 304 and the like. The computation unit 302 is an artificial intelligence including a database unit 306 that accumulates data and an inference unit 308 that estimates a conclusion from the data. The malfunction cause identifying model 310 is realized as a result of a supervised learning by the computation unit 302. The display unit 304 is an output device that displays a processing result of the computation unit 302 and the like. For example, the display unit 304 is a display, a printer and the like.

Figure 14:
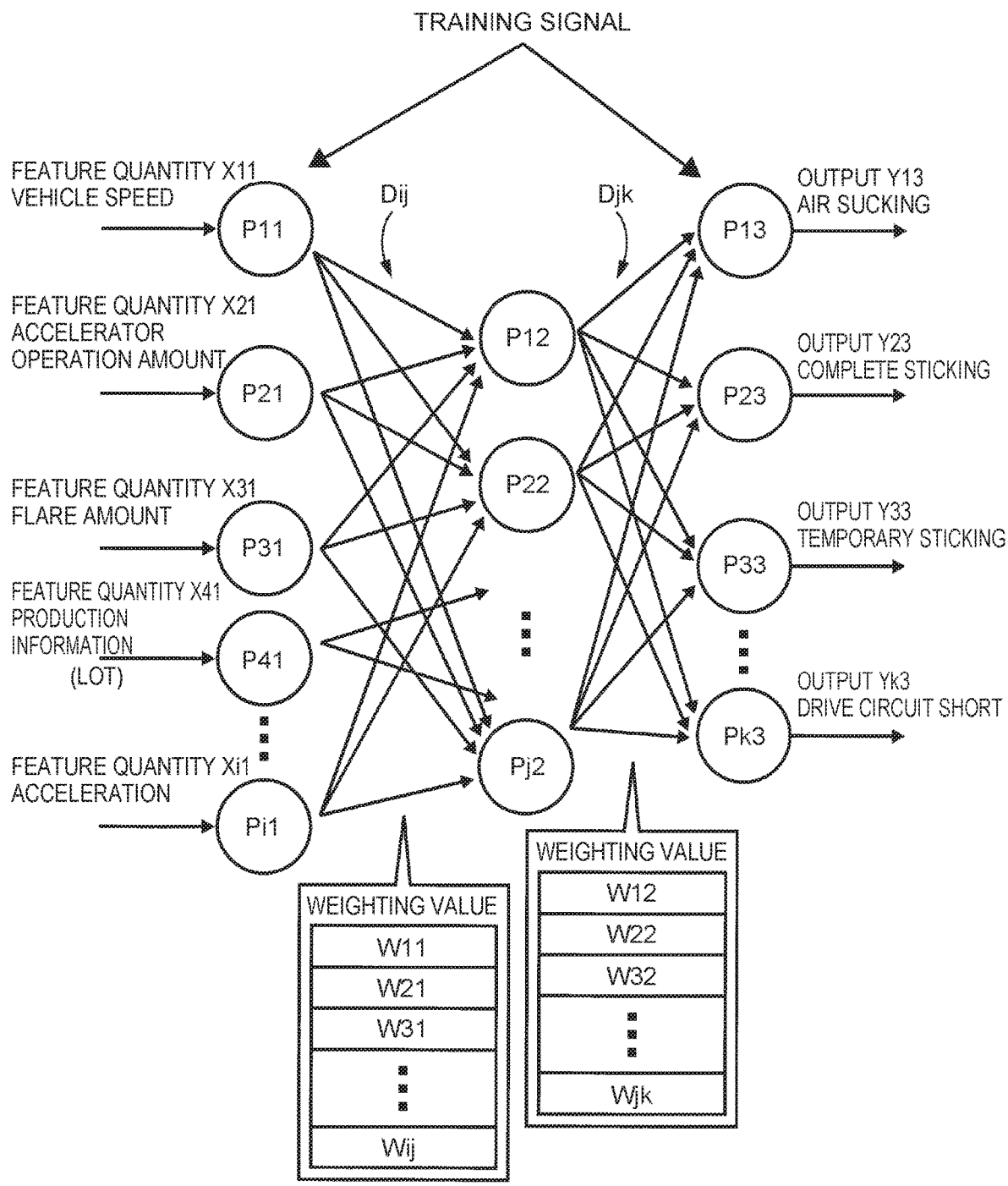
FIG. 14 is a diagram showing an example of a malfunction cause identifying model.

FIG. 14 is a diagram showing an example of the malfunction cause identifying model 310. In FIG. 14, the malfunction cause identifying model 310 is a neural network on the basis of the kinds of the detection values of the in-vehicle sensor group 160 of the vehicle 10. The malfunction cause identifying model 310 can be configured by modeling a biological neuronal cell group using software with a computer program, or using hardware in which electronic elements are combined. The malfunction cause identifying model 310 has a multi-layer structure constituted by an input layer including i neuronal cell elements (=neurons) Pi1 (P11 to Pi1), an intermediate layer including j neuronal cell elements Pj2 (P12 to Pj2), and an output layer including k neuronal cell elements Pk3 (P13 to Pk3). The intermediate layer may have a multi-layer structure. For transmitting the state of the neuronal cell element from the input layer to the output layer, the malfunction cause identifying model 310 is provided with transmitting elements Dij that combine the i neuronal cell elements Pi1 and the j neuronal cell elements Pj2 with combination coefficients, that is, weighting values Wij, and transmitting elements Djk that combine the j neuronal cell elements Pj2 and the k neuronal cell elements Pk3 with weighting values Wjk.

The malfunction cause identifying model 310 is a malfunction analysis system having the weighting values Wij, Wjk that are obtained as a result of a machine learning with a predetermined algorithm. In the supervised learning in the malfunction cause identifying model 310, training data, that is, training signals identified in the experimental vehicle 400 are used. As a training signal for the input layer, data (see "X11 to Xi1" in FIG. 14) of the detection values of the in-vehicle sensor group 402 when the malfunction has occurred in the experimental vehicle 400 is given, and as a training signal for the output layer, the cause (see "Y13 to Yk3" in FIG. 14) for the malfunction identified based on the detection values of the experimental vehicle sensor 404 in the experimental vehicle 400 is given. In the example shown in FIG. 10 to FIG. 13, for example, the correlation between the flare amount of the engine rotating speed Ne during the transition of the gear shift of the stepped transmission unit 20 and the cause for the malfunction is strong, and therefore, the weighting value for the correlation is a large value. In the analysis using the artificial intelligence, it is only necessary to know the correlation. As illustrated in FIG. 10 to FIG. 13, for the data of the detection values of the in-vehicle sensor group 402, by using the data that changes with time, the cause for the malfunction is identified more easily than by using the data at a certain time point. As the training signal for the input layer, the data that is about the detection values of the in-vehicle sensor group 402 and that changes with time is given. As described above, the malfunction cause identifying model 310 is a malfunction cause identifying model that is preset using the experimental vehicle 400, and that indicates the relation between the cause for the malfunction in the experimental vehicle 400 identified based on the detection values of the experimental vehicle sensor 404 and the detection values of the in-vehicle sensor group 402 when the malfunction has occurred.

The vehicle 10 is a mass-produced vehicle, and therefore, even when the same malfunction has occurred, the detection values of the in-vehicle sensor group 160 can differ depending on the difference in the production lot of the vehicle 10. Therefore, the training signal to be used for the supervised learning in the malfunction cause identifying model 310 is altered based on a statistical difference in the detection values of the in-vehicle sensor group 160 that differ depending on the production lot of the vehicle 10. For example, variation of the detection values of the in-vehicle sensor group 160 depending on the difference in the production lot is calculated by a statistical technique. Then, the variation is added to the data of the detection values of the in-vehicle sensor group 402, and the resulting data is given as the training signal for the input layer.

Accordingly, as shown in FIG. 14, the malfunction cause identifying model 310 is a malfunction cause identifying model that further indicates the relation between the cause for the malfunction in the experimental vehicle 400 identified based on the detection values of the experimental vehicle sensor 404 and information (see "production information (lot)" in FIG. 14) about the production lot of the vehicle 10. The information about the production lot of the vehicle 10 is information indicating the difference in the production lot of the vehicle 10, and for example, includes serial numbers of the production lots of the respective sensors of the in-vehicle sensor group 160.

In order to realize the control function for improving the accuracy of the identification of the cause for the malfunction in the vehicle 10, the vehicle malfunction cause identifying device 300 further includes state determination means, that is, a state determination unit 312, and malfunction cause identifying means, that is, a malfunction cause identifying unit 314.

The state determination unit 312 determines whether the malfunction has occurred in the vehicle 10 in actual use. For example, the state determination unit 312 determines whether the malfunction has occurred in the vehicle 10 in actual use, based on whether the electronic control device 90 of the vehicle 10 determines that the malfunction has occurred in the vehicle 10. The electronic control device 90 determines whether the malfunction has occurred in the vehicle 10, based on the detection values of the in-vehicle sensor group 160 that indicate the behavior state of the vehicle 10. Alternatively, the state determination unit 312 may determine whether the malfunction has occurred in the vehicle 10 in actual use, based on the detection values of the in-vehicle sensor group 160 that are acquired from the server 200. More specifically, in the case where the malfunction in the vehicle 10 is the faulty gear shift of the stepped transmission unit 20, it is determined whether the faulty gear shift of the stepped transmission unit 20 has occurred, based on whether the flare amount of the engine rotating speed Ne or the MG2 rotating speed Nm has become equal to or larger than the predetermined flare amount during the transition of the gear shift control after the completion of the learning control in the gear shift control of the stepped transmission unit 20. Alternatively, it is determined whether the faulty gear shift of the stepped transmission unit 20 has occurred, based on whether the tie-up has occurred during the transition of the gear shift control after the completion of the learning control in the gear shift control of the stepped transmission unit 20. Alternatively, it is determined whether the faulty gear shift of the stepped transmission unit 20 has occurred, based on whether the gear shift shock in which the front-rear acceleration Gx becomes equal to or greater than the predetermined acceleration during the transition of the gear shift control after the completion of the learning control in the gear shift control of the stepped transmission unit 20. In this way, the vehicle malfunction cause identifying device 300 determines whether the malfunction has occurred in the vehicle 10, based on the detection values of the in-vehicle sensor group 160.

In the case where the state determination unit 312 determines that the malfunction has occurred in the vehicle 10, the malfunction cause identifying unit 314 acquires, from the server 200, big data about the vehicle 10 when the malfunction has occurred in the vehicle 10. The big data about the vehicle 10 is the detection values of the in-vehicle sensor group 160 when the malfunction has occurred in the vehicle 10, which are the detection values sent from the vehicle 10 to the server 200. Since the data that is about the detection values of the in-vehicle sensor group 402 and that changes with time is given as the training signal for the input layer of the malfunction cause identifying model 310, the malfunction cause identifying unit 314 acquires the detection values of the in-vehicle sensor group 160 that change with time. Accordingly, the temporal change in the detection values of the in-vehicle sensor group 160 is used for the identification of the cause for the malfunction. Further, since the information about the production lot of the vehicle 10 is given as the training signal for the input layer of the malfunction cause identifying model 310, the malfunction cause identifying unit 314 acquires the information about the production lot of the vehicle 10 that is sent from the vehicle 10 to the server 200, in addition to the detection values of the in-vehicle sensor group 160. The big data about the vehicle 10 includes also the information about the production lot of the vehicle 10. Accordingly, the malfunction cause identifying unit 314 identifies the cause for the malfunction in the vehicle 10, also in consideration of the information about the production lot of the vehicle 10.

The malfunction cause identifying unit 314 analyzes the cause for the malfunction in the vehicle 10, using the acquired big data about the vehicle 10 and the malfunction cause identifying model 310. That is, the malfunction cause identifying unit 314 inputs the acquired big data about the vehicle 10 to the malfunction cause identifying model 310, and analyzes the cause for the malfunction in the vehicle 10. The malfunction cause identifying unit 314 determines whether the cause for the malfunction has been identified. In the case where the malfunction cause identifying unit 314 determines that the cause for the malfunction has been identified, the malfunction cause identifying unit 314 displays the identified cause for the malfunction, on the display unit 304 and the like. It is desirable that only one content be identified as the cause for the malfunction. However, in the case where there is a plurality of candidates as the cause for the malfunction, the candidates are arrayed in the order from the candidate having the highest probability that the malfunction analysis is correct. In the case where the malfunction cause identifying unit 314 determines that the cause for the malfunction cannot be identified, the malfunction cause identifying unit 314 displays information indicating that the cause for the malfunction is unknown, on the display unit 304 and the like.

As described above, the malfunction cause identifying unit 314 identifies the cause for the malfunction in the vehicle 10, by applying the detection values of the in-vehicle sensor group 160 when the malfunction has occurred in the vehicle 10, to the malfunction cause identifying model 310. Because of the use of the malfunction cause identifying model 310 that is preset using the experimental vehicle 400 equipped with the experimental vehicle sensor 404 that is not equipped in the vehicle 10, it is possible to accurately identify the cause for the malfunction in the vehicle 10, even in the analysis using the big data about the vehicle 10 in which the number of the sensors is less than that in the experimental vehicle 400. Further, since the malfunction cause identifying model 310 includes the information about the production lot of the vehicle 10, it is possible to improve the probability that the malfunction analysis is correct.

Figure 15:
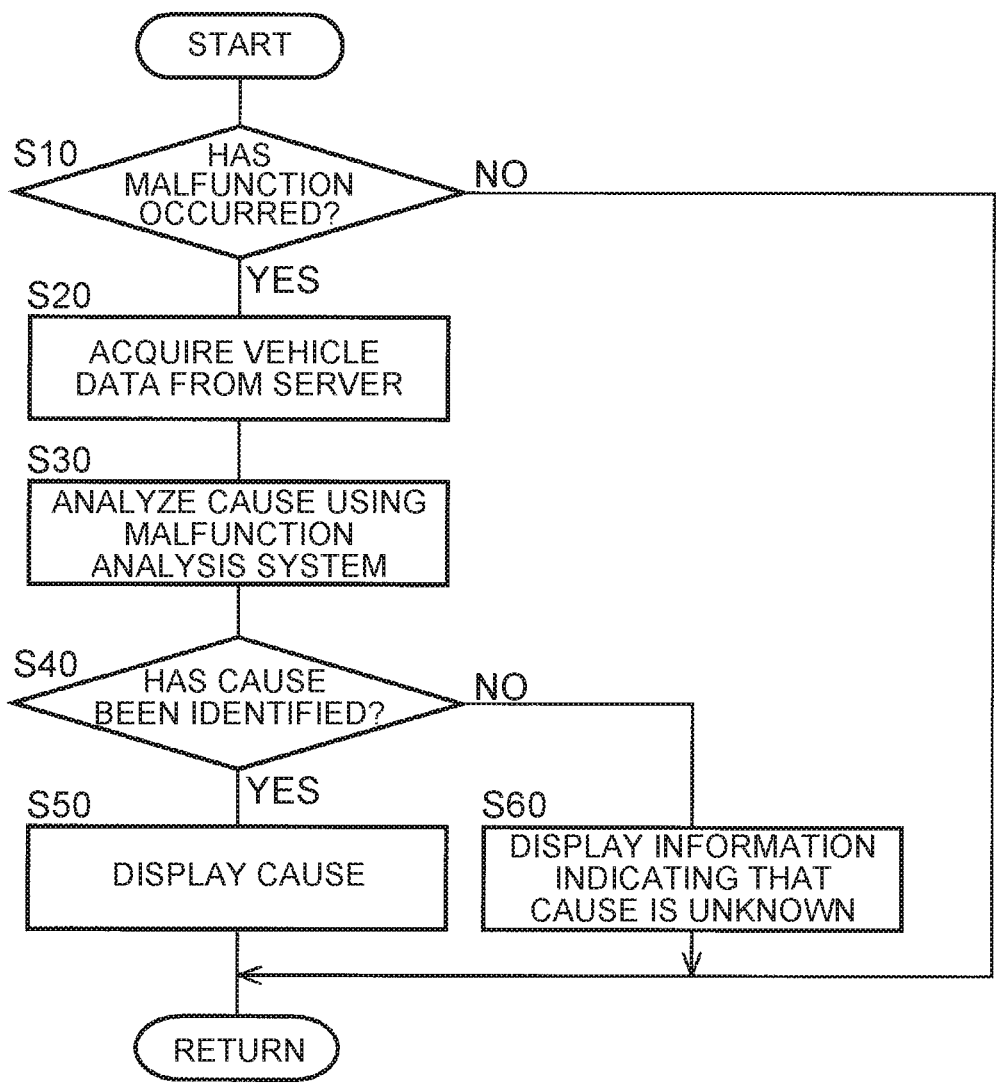
FIG. 15 is a flowchart for describing a major part of a control operation of a vehicle malfunction cause identifying device, and is a flowchart for describing a control operation for improving the accuracy of the identification of the cause of the malfunction in the vehicle.

FIG. 15 is a flowchart for describing a major part of a control operation of the vehicle malfunction cause identifying device 300, and is a flowchart for describing a control operation for improving the accuracy of the identification of the cause for the malfunction in the vehicle 10. The flowchart is repeatedly executed, for example.

In FIG. 15, first, in step S10 (hereinafter, "step" is omitted) corresponding to the function of the state determination unit 312, it is determined whether the malfunction has occurred in the vehicle 10 in actual use. In the case where the determination in S10 is negative, the routine is ended. In the case where the determination in S10 is positive, the big data about the vehicle 10 when the malfunction has occurred is acquired from the server 200, in S20 corresponding to the function of the malfunction cause identifying unit 314. Next, in S30 corresponding to the function of the malfunction cause identifying unit 314, the acquired big data about the vehicle 10 is input to the malfunction cause identifying model 310 that is a malfunction analysis system, and the cause for the malfunction is analyzed in the malfunction cause identifying model 310. Next, in S40 corresponding to the function of the malfunction cause identifying unit 314, it is determined whether the cause for the malfunction has been identified. In the case where the determination in S40 is positive, the identified cause for the malfunction is displayed, in S50 corresponding to the function of the malfunction cause identifying unit 314. On the other hand, in the case where the determination in S40 is negative, the information indicating that the cause for the malfunction is unknown is displayed, in S60 corresponding to the function of the malfunction cause identifying unit 314.

As described above, with the embodiment, the cause for the malfunction in the vehicle 10 is identified using the preset malfunction cause identifying model 310 indicating the relation between the cause for the malfunction identified based on the detection values of the experimental vehicle sensor 404 such as the oil pressure sensors, which are detection values allowing the cause for the malfunction to be identified more easily than the detection values of the in-vehicle sensor group 402 that is the same as the in-vehicle sensor group 160 equipped in the vehicle 10, and the detection values of the in-vehicle sensor group 402, and the detection values of the in-vehicle sensor group 160 when the malfunction has occurred in the vehicle 10. Therefore, in the case where the vehicle 10 is not equipped with the experimental vehicle sensor 404, it is possible to improve the accuracy of the identification of the cause for the malfunction in the vehicle 10.

With the embodiment, it is determined whether the malfunction has occurred in the vehicle 10, based on the detection values of the in-vehicle sensor group 160. Therefore, it is possible to accurately identify the cause for the malfunction in the vehicle 10 determined based on the detection values of the in-vehicle sensor group 160, using the malfunction cause identifying model 310 preset based on the detection values of the experimental vehicle sensor 404 that is not equipped in the vehicle 10.

With the embodiment, the cause for the malfunction is identified also in consideration of the information about the production lot of the vehicle 10. Therefore, even when the detection values of the in-vehicle sensor group 160 vary depending on the difference in the production lot, it is possible to accurately identify the cause for the malfunction in the vehicle 10.

With the embodiment, the detection values of the experimental vehicle sensor 404 are the values of the oil pressures Pc1, Pc2, Pb1, Pb2 detected by the oil pressure sensors. Therefore, it is possible to accurately identify the cause for the faulty gear shift of the stepped transmission unit 20.

With the embodiment, the temporal change in the detection values of the in-vehicle sensor group 160 is used for the identification of the cause for the malfunction. Therefore, it is possible to accurately identify the cause for the malfunction using the malfunction cause identifying model 310.

With the embodiment, the malfunction cause identifying model 310 is realized as a result of the supervised learning by the computation unit 302 that is an artificial intelligence. Therefore, it is possible to construct the malfunction cause identifying model that allows the cause for the malfunction to be accurately identified.

With the embodiment, the training data to be used for the supervised learning by the computation unit 302 is altered based on the statistical difference in the detection values of the in-vehicle sensor group 160, which differ depending on the production lot of the vehicle 10. Therefore, even when the detection values of the in-vehicle sensor group 160 vary depending on the difference in the production lot, it is possible to construct the malfunction cause identifying model that allows the cause for the malfunction to be accurately identified.

The embodiment of the disclosure has been described above in detail based on the drawings. The disclosure can be applied also to other modes.

For example, in the above-described embodiment, the vehicle malfunction cause identifying device 300 is an external device that is provided separately from the vehicle 10, but the disclosure is not limited to this mode. For example, a part or whole of the malfunction cause identifying function of the vehicle malfunction cause identifying device 300 may be included in the server 200, or may be included in the vehicle 10, particularly, in the electronic control device 90. Further, the content of the cause for the malfunction may be displayed on a monitor or the like that is provided separately from the vehicle malfunction cause identifying device 300, or may be displayed on a monitor of a personal computer or the like that is connected to the server 200 through a predetermined network. For example, the vehicle malfunction cause identifying device 300 is used when the vehicle 10 is taken to a maintenance factory, or is used in the manufacturer of the vehicle 10.

In the above-described embodiment, the malfunction cause identifying model 310 is realized in the computation unit 302 that is an artificial intelligence, but the disclosure is not limited to this mode. For example, the malfunction cause identifying model 310 can be realized also by a computer or the like that is not based on the neural network.

In the above-described embodiment, the faulty gear shift of the stepped transmission unit 20 has been described as an example of the malfunction in the vehicle 10, but the disclosure is not limited to this mode. For example, the malfunction may be an anomaly that gives a feeling of strangeness to the driver.

In the above-described embodiment, the vehicle 10 including the composite transmission 40 has been described as an example of the vehicle in which the malfunction occurs, but is not limited to the vehicle 10. The disclosure can be applied to any vehicle in which some kind of malfunction occurs.

The above-described embodiment is just an example. The disclosure can be carried out while various modifications and improvements are made based on the knowledge of a person skilled in the art.

What is claimed is:

1. A vehicle malfunction cause identifying device that identifies a cause for a malfunction in a vehicle using a detection value of an in-vehicle sensor when the malfunction has occurred in the vehicle, the in-vehicle sensor being equipped in the vehicle and detecting a behavior state of the vehicle,
   wherein:
   the vehicle malfunction cause identifying device identifies the cause for the malfunction in the vehicle by applying the detection value of the in-vehicle sensor when the malfunction has occurred in the vehicle to a malfunction cause identifying model of the vehicle malfunction cause identifying device that is preset using a second vehicle equipped with a first sensor and a second sensor, the first sensor being the same as the in-vehicle sensor, the second sensor being not equipped in the vehicle, a detection value of the second sensor allowing a cause for a malfunction in the second vehicle to be better identified relative to a detection value of the first sensor, the malfunction cause identifying model indicating a relation between the cause for the malfunction in the second vehicle identified based on the detection value of the second sensor and the detection value of the first sensor when the malfunction has occurred in the second vehicle,
   the malfunction is a faulty gear shift of a vehicle transmission including a hydraulic frictional engagement device, and
   the detection value of the second sensor is a value of an oil pressure of an operating oil by which an operating state of the frictional engagement device is switched.

2. The vehicle malfunction cause identifying device according to claim 1, wherein the vehicle malfunction cause identifying device determines whether the malfunction has occurred in the vehicle, based on the detection value of the in-vehicle sensor.

3. The vehicle malfunction cause identifying device according to claim 1, wherein:
   the malfunction cause identifying model further indicates a relation between the cause for the malfunction in the second vehicle identified based on the detection value of the second sensor and information about a production lot of the vehicle; and
   the vehicle malfunction cause identifying device identifies the cause for the malfunction in the vehicle, also in consideration of the information about the production lot of the vehicle.

4. The vehicle malfunction cause identifying device according to claim 1, wherein a temporal change in the detection value of the in-vehicle sensor is used for the identification of the cause for the malfunction in the vehicle.

5. The vehicle malfunction cause identifying device according to claim 1, wherein the malfunction cause identifying model is realized as a result of a supervised learning by an artificial intelligence including a database unit that accumulates data and an inference unit that estimates a conclusion from the data.

6. The vehicle malfunction cause identifying device according to claim 5, wherein training data to be used for the supervised learning by the artificial intelligence is altered based on a statistical difference in the detection value of the in-vehicle sensor, the detection value of the in-vehicle sensor differing depending on a production lot of the vehicle.

* * * * *